(12) United States Patent
Kanai et al.

(10) Patent No.: US 8,157,384 B2
(45) Date of Patent: Apr. 17, 2012

(54) IMAGE DISPLAY DEVICE

(75) Inventors: Masashi Kanai, Azumino (JP); Taisuke Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 12/256,138

(22) Filed: Oct. 22, 2008

(65) Prior Publication Data
US 2009/0109349 A1    Apr. 30, 2009

(30) Foreign Application Priority Data

Oct. 24, 2007  (JP) ................................. 2007-276065

(51) Int. Cl.
G03B 21/00 (2006.01)
G02B 5/32 (2006.01)
G02B 5/18 (2006.01)

(52) U.S. Cl. .............................. 353/31; 359/15; 359/567

(58) Field of Classification Search .................... 353/31, 353/94; 359/15, 27, 558, 566, 567, 573; 382/274, 280
See application file for complete search history.

(56) References Cited

U.S. PATENT DOCUMENTS

| 5,231,432    | A  * | 7/1993  | Glenn          | 353/31  |
| 7,775,668    | B2 * | 8/2010  | Yao et al.     | 353/31  |
| 2004/0227907 | A1 * | 11/2004 | Glenn          | 353/94  |
| 2005/0073845 | A1 * | 4/2005  | Matsui         | 362/293 |
| 2007/0019909 | A1 * | 1/2007  | Yamauchi et al.| 385/37  |
| 2007/0070303 | A1 * | 3/2007  | Yonekubo       | 353/94  |

FOREIGN PATENT DOCUMENTS

| JP | A 11-271536  | 10/1999 |
| JP | A 2003-207747 | 7/2003 |
| JP | A 2005-17500 | 1/2005 |
| JP | A 2007-17695 | 1/2007 |
| JP | A 2007-33576 | 2/2007 |

OTHER PUBLICATIONS

Shiraki at al., "Simplified Holographic Reconstruction System Using Graphics Processing Unit and Projector," *Eizo Jyoho Media Gakkaishi*, vol. 61, No. 4, 2007, pp. 508-513.

* cited by examiner

*Primary Examiner* — William C Dowling
*Assistant Examiner* — Ryan Howard
(74) *Attorney, Agent, or Firm* — Oliff & Berridge, PLC

(57) ABSTRACT

An image display device includes a light source, a diffractive optical element adapted to diffract a light beam emitted from the light source, and a light modulation element adapted to modulate a diffracted light beam obtained by the diffractive optical element, and a diffraction characteristic of the diffractive optical element is controlled based on a diffractive optical element control signal provided to the image display device.

8 Claims, 13 Drawing Sheets

IMAGE DISPLAY DEVICE

RELATED APPLICATIONS

This application claims priority to Japanese Patent Application No. 2007-276065 filed Oct. 24, 2007 which is hereby expressly incorporated by reference herein.

BACKGROUND

1. Technical Field

The present invention relates to an image display device.

2. Related Art

In the past, there have been known projection image display devices (projectors) using a light source such as a laser. In the projection image display devices of this kind, laser beams of the respective color components such as RGB are modulated in luminance in accordance with an image signal, and then combined to display an image. In recent years, it has been required for the projection image display device including other types than the type mentioned above to have a further high resolution and high contrast, and therefore, further improvement of image quality thereof is in progress.

As one of problems such projection image display device with a light source for displaying images should solve, there can be cited deterioration in contrast caused by leakage of light or stray light generated by an optical element forming an optical system. There have been proposed various technologies for preventing the deterioration in contrast. For example, JP-A-2005-17500 (Document 1) discloses a technology in which a movable shield plate is provided to control an amount of light provided to a light modulation element from a light source, thereby reducing the amount of light input when displaying a dark image, thus increasing the contrast in a pseudo manner.

However, since in the technology disclosed in the Document 1 the amount of light of the entire screen is uniformly controlled, there is caused problems that in the case in which a luminescent spot (a light source or a glossy image) exists in a dark image, the luminance of the luminescent spot is reduced, and that a so-called grayish black picture appears.

SUMMARY

In view of the technical problem described above, the invention has an advantage of providing an image display device which displays luminescent spots with high luminance and dark images with low luminance, thereby achieving high contrast.

According to an aspect of the invention, an image display device includes a light source, a diffractive optical element adapted to diffract a light beam emitted from the light source, and a light modulation element adapted to modulate a diffracted light beam obtained by the diffractive optical element, and a diffraction characteristic of the diffractive optical element is controlled based on a diffractive optical element control signal provided to the image display device.

According to this aspect of the invention, since the diffractive optical element is disposed between the light source and the light modulation element, and the image can be displayed by executing the light modulation on the diffracted light beam obtained by diffracting the light beam from the light source so as to have a desired luminance distribution, it becomes possible to achieve high contrast by displaying the luminescent spot with high luminance using the amount of light from the light source for other part of the image, and displaying a dark image with low luminance.

Further, according to this aspect of the invention, since it is eliminated to control the light intensity uniformly through the entire screen, even in the case in which a luminescent spot (a light source or a glossy area) exists in the image, for example, it becomes possible to prevent the luminance of the luminescent spot from being lowered, or it becomes possible to prevent a so-called grayish black picture from occurring.

Further, according to another aspect of the invention, an image display device includes a plurality of light sources provided to respective color components, a diffractive optical element used commonly to the plurality of light sources, and adapted to diffract light beams emitted from the plurality of light sources, and a plurality of light modulation elements provided to the respective color components, and adapted to modulate the diffracted light beams obtained by the diffractive optical element, and a diffraction characteristic of the diffractive optical element is controlled based on a diffractive optical element control signal provided to the image display device.

According to this aspect of the invention, since the diffractive optical element is disposed between the light source and the light modulation element, and the image can be displayed by executing the light modulation on the diffracted light beam obtained by diffracting the light beam from the light source so as to have a desired luminance distribution, it becomes possible to achieve high contrast by displaying the luminescent spot with high luminance using the amount of light from the light source for other part of the image, and displaying a dark image with low luminance.

Further, according to this aspect of the invention, since it is eliminated to control the light intensity uniformly through the entire screen, even in the case in which a luminescent spot (a light source or a glossy area) exists in the image, for example, it becomes possible to prevent the luminance of the luminescent spot from being lowered, or it becomes possible to prevent a so-called grayish black picture from occurring.

Further, according to this aspect of the invention, since it is arranged to use the diffractive optical element commonly to the plurality of light sources, the number of components of the image display device can significantly be reduced, thus providing contribution to cost reduction and reduction of the power consumption of the image display device.

In the image display device according to this aspect of the invention, it is possible that the plurality of light sources are controlled to emit the light beams with the same intensity, and the plurality of light modulation elements are controlled in an amount of modulation for each of the color components.

According to the specific configuration of this aspect of the invention, since it is arranged to control the intensity of the light beams of the light sources to be aligned, it becomes possible to simplify the control of the image display using the diffractive optical element and the light modulation element.

Further, according to another aspect of the invention, an image display device includes a plurality of light sources provided to respective color components, a plurality of diffractive optical elements provided to the respective color components, and adapted to diffract light beams emitted from the plurality of light sources corresponding to the respective color components, and a plurality of light modulation elements provided to the respective color components, and adapted to modulate the diffracted light beams obtained by the plurality of diffractive optical elements corresponding to the respective color components, and a diffraction characteristic of each of the diffractive optical elements is controlled based on a diffractive optical element control signal provided to the image display device.

According to this aspect of the invention, since the diffractive optical element is disposed between the light source and the light modulation element, and the image can be displayed by executing the light modulation on the diffracted light beam obtained by diffracting the light beam from the light source so as to have a desired luminance distribution, it becomes possible to achieve high contrast by displaying the luminescent spot with high luminance using the amount of light from the light source for other part of the image, and displaying a dark image with low luminance.

Further, according to this aspect of the invention, since it is eliminated to control the light intensity uniformly through the entire screen, even in the case in which a luminescent spot (a light source or a glossy area) exists in the image, for example, it becomes possible to prevent the luminance of the luminescent spot from being lowered, or it becomes possible to prevent a so-called grayish black picture from occurring.

Further, according to this aspect of the invention, since the diffractive optical element is provided respectively to the light sources, the intensity of the light beams of the light sources can be controlled for each of the color components, and it is not required to align the intensity of the light beams of the light sources for respective color components. Therefore, it can be eliminated to unnecessarily raise the intensity of the light beams emitted from the light sources compared to the case in which the control is performed aligning the intensity of the light beams emitted from the light sources corresponding to the respective color components, thus it becomes possible to achieve reduction of the power consumption.

In the image display device according to this aspect of the invention, it is possible that the plurality of light sources is controlled in intensity of the light beams for each of the color components, and the plurality of light modulation elements are controlled in an amount of modulation for each of the color components.

According to the specific configuration of this aspect of the invention, since it becomes possible to finely control the diffractive optical elements, the light modulation elements, and the light sources, it becomes possible to contribute to further prevention of the deterioration in the image quality and reduction of the power consumption.

In the image display device according to this aspect of the invention, it is possible that the diffractive optical element control signal is a signal generated based on the input image signal.

According to the specific configuration of this aspect of the invention, it becomes possible to provide an image display device which displays luminescent spots with high luminance and dark images with low luminance in displaying the image corresponding to the input image signal, thereby achieving high contrast.

In the image display device according to this aspect of the invention, it is possible that the diffractive optical element control signal is generated using a diffraction pattern corresponding to an illumination distribution of the light beam from the light source calculated based on the input image signal.

According to the specific configuration of this aspect of the invention, the process for using the light beams from the light sources, which is normally reduced for expressing a dark part of the image, as the light for the other part in the image can be simplified using the diffraction pattern for the diffractive optical element.

In the image display device according to this aspect of the invention, it is possible that the light source generates a coherent light beam.

According to the specific configuration of this aspect of the invention, since the diffraction phenomenon of the diffractive optical element is used, it becomes possible to improve the image quality of the display image using the coherent light beam.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, some embodiments of the invention will be described in detail with reference to the accompanying drawings. It should be noted that the embodiments described below do not unreasonably limit the content of the invention as set forth in the appended claims. Further, not all of the constituents of the configurations described below are essential elements of the invention.

First Embodiment

An image display device according to the first embodiment of the invention and an image processing device for controlling the image display device are applied to, for example, a following image display system.

Figure 1:
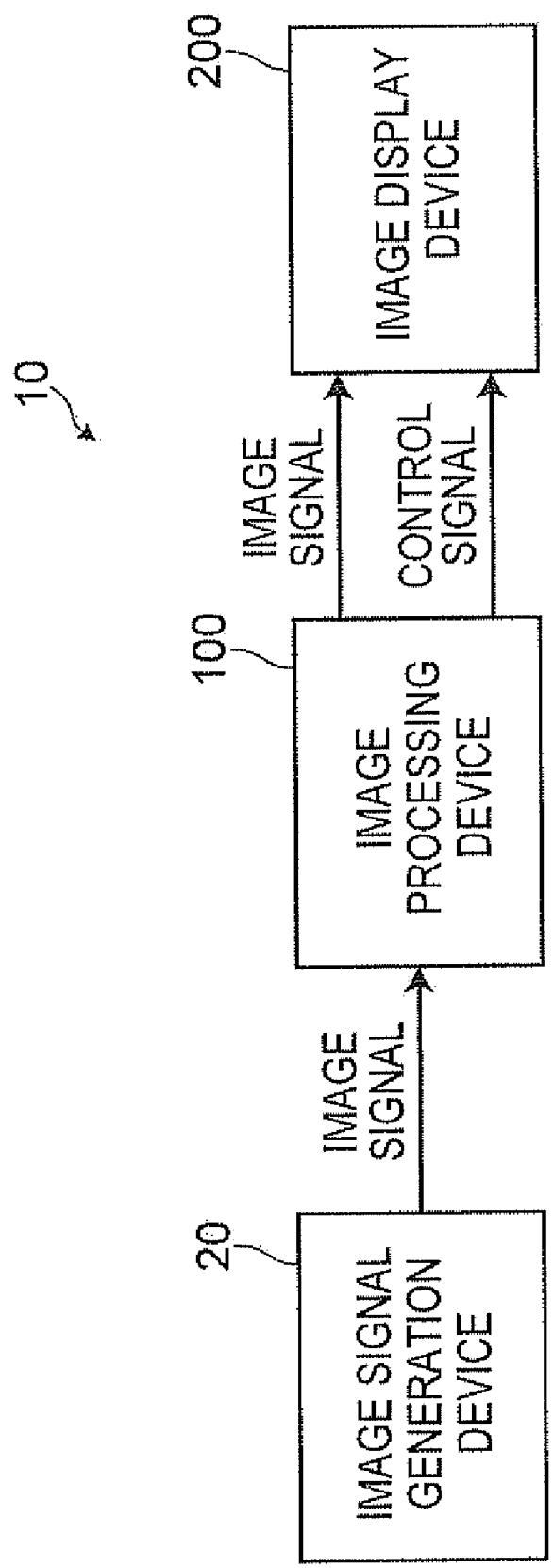
FIG. 1 is a block diagram of a configuration example of an image display system according to a first embodiment of the invention.

FIG. 1 shows a block diagram of a configuration example of the image display system according to the first embodiment of the invention.

The image display system 10 can include an image signal generation device 20, an image processing device 100, and an image display device 200. The image signal generation device 20 generates an image signal corresponding to the image (content) to be displayed on the image display device 200, and outputs the image signal to the image processing device 100 as an input image signal for the image processing device 100. The image processing device 100 receives the image signal from the image signal generation device 20, and generates a control signal for controlling the image display device 200 including a diffractive optical element and light modulation elements based on the image signal. The image display device 200 displays an image obtained by the light modulation elements modulating the diffracted light beams obtained by the diffractive optical element diffracting the light from a light source.

Figure 2:
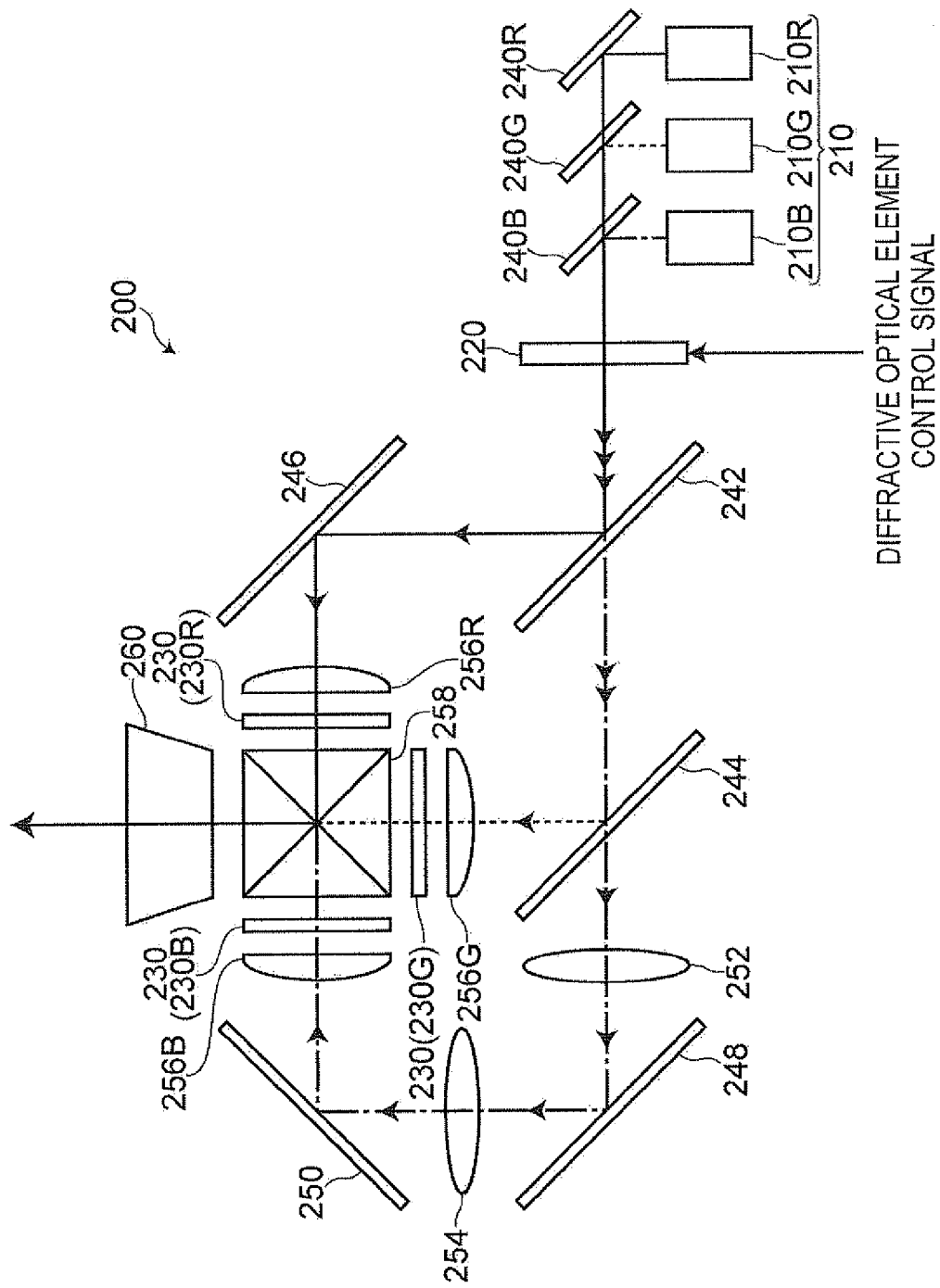
FIG. 2 is a block diagram of a configuration example of an image display device according to a first embodiment of the invention.

FIG. 2 shows a block diagram of a configuration example of the image display device 200 according to the first embodiment of the invention.

The image display device 200 includes the light source 210, the diffractive optical element 220 irradiated with the light from the light source 210, and the light modulation elements 230 for modulating the diffracted light beams generated by the diffractive optical element 220, and is controlled in the diffraction characteristic of the diffractive optical element 220 based on a diffractive optical element control signal provided thereto. The diffractive optical element control signal is generated in the image processing device 100 based on the image signal (input image signal) from the image signal generation device 20.

The diffractive optical element 220 is irradiated with the light from the light source 210 as the incident light, and has a function of diffracting the light from the light source 210 so that the light has a luminance distribution designated based on the diffractive optical element control signal. As such a diffractive optical element 220, there can be cited a liquid crystal (LC)-computer generated hologram (CGH) adopting a transmissive liquid crystal panel, for example. This liquid crystal panel is what is obtained by encapsulating a liquid crystal material as an electrooptic material between a pair of transparent glass plates, and diffracts the incident light using, for example, polysilicon thin film transistors (TFTs) as switching elements so that the light has a diffraction pattern designated by the diffractive optical element control signal from the image processing device 100.

The light modulation elements 230 are irradiated with the diffracted light beams obtained by the diffractive optical element 220, and modulates the penetration (transmission, modulation rate) of the light of every pixel based on the image signal from the image processing device 100. As such light modulation elements 230, there are adopted light valves each formed of a transmissive liquid crystal panel. The liquid crystal panel is what is obtained by encapsulating a liquid crystal material as an electro-optic material between a pair of transparent glass plates, and modulates the penetration of the light of each of the pixels in accordance with the image signal from the image processing device 100 using, for example, poly-silicon TFTs as switching elements.

In the first embodiment, since the diffractive optical element 220 is provided, and the diffracted light obtained by the diffractive optical element 220 diffracting the light from the light source is modulated, it is preferable that the light source 210 is a coherent light source such as a light emitting diode (LED) using an electroluminescence effect so as to have high coherency or a laser source with coherency. Hereinafter, explanations will be made assuming that a laser source for generating a laser beam is adopted as the light source 210.

More specifically, in such an image display device 200, the light source 210 includes a plurality of light sources 210R, 210G, 210B (R light source 210R, G light source 210G, and B light source 210B) provided respectively for color components of the RGB color space, and the light modulation elements 230 also include a plurality of light modulation elements 230R, 230C, 230B (R light modulation element 230R, G light modulation element 230G, and B light modulation element 230B) provided respectively for color components of the RGB color space. In contrast, the diffractive optical element 220 is used commonly by the plurality of light sources 210R, 210G, and 210B, and is irradiated with the light from the plurality of light sources 210R 210G, and 210B.

The R light source 210R generates a red laser beam with a wavelength of the light of the R component out of the three primary colors of RGB. The G light source 210G generates a green laser beam with a wavelength of the light of the G component out of the three primary colors of RGB. The B light source 210B generates a blue laser beam with a wavelength of the light of the B component out of the three primary colors of RGB. The R light modulation element 230R modulates the diffracted light beam obtained by the diffractive optical element 220 diffracting the red laser beam from the R light source 210R. The G light modulation element 230G modulates the diffracted light beam obtained by the diffractive optical element 220 diffracting the green laser beam from the G light source 210G. The B light modulation element 230B modulates the diffracted light beam obtained by the diffractive optical element 220 diffracting the blue laser beam from the B light source 210B. By adopting such a configuration, it becomes sufficient to only provide one diffractive optical element 220 for the three primary color light sources of RGB, thus cost reduction of the image display device 200 can be achieved.

The image display device 200 shown in FIG. 2 can further include mirrors 240R, 240G, 240B, dichroic mirrors 242, 244, mirrors 246, 248, 250, relay lenses 252, 254, collimating lenses 256R, 256G, 256B, a dichroic prism 258, and a projection lens 260.

The mirror 240R totally reflects the red laser beam from the R light source 210R to guide the laser beam to the diffractive optical element 220. The mirror 240G totally reflects the green laser beam from the G light source 210G to guide the laser beam to the diffractive optical element 220. The mirror 240B totally reflects the blue laser beam from the B light source 210B to guide the laser beam to the diffractive optical element 220. The diffractive optical element 220 diffracts the laser beams from the light sources 210R, 210G, and 210B so that the laser beams have the luminance distribution designated by the diffractive optical element control signal.

Here, the diffractive optical element 220 in the first embodiment will be explained with reference to FIGS. 3 through 5. It should be noted that the explanations will be presented assuming that the LC-CGH is adopted as the diffractive optical element 220.

Figure 3:
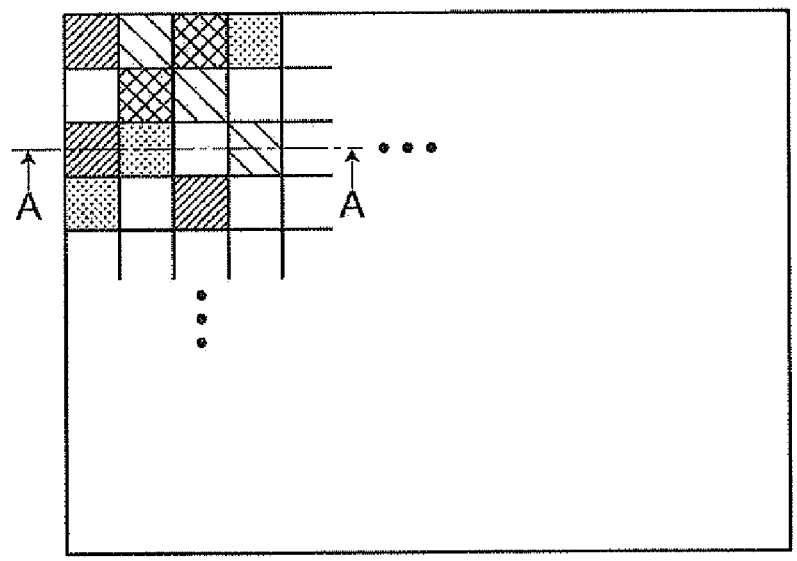
FIG. 3 is a schematic plan view of a diffractive optical element in the first embodiment of the invention.

FIG. 3 shows a schematic plan view of the diffractive optical element 220 in the first embodiment.

Figure 4:
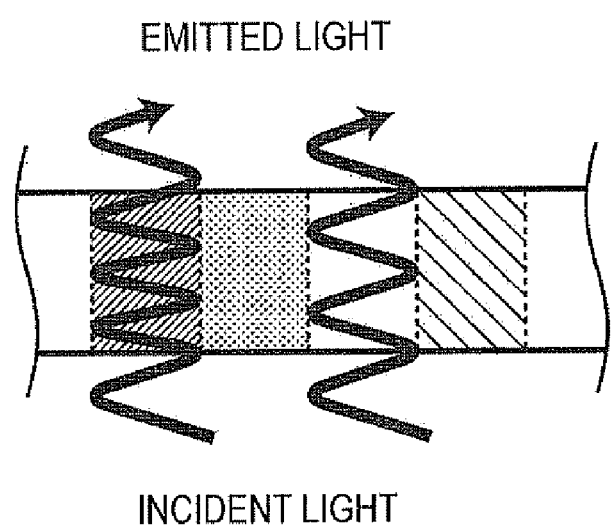
FIG. 4 is a schematic cross-sectional view of the diffractive optical element shown in FIG. 3 along the A-A cutting line.

FIG. 4 shows a schematic cross-sectional view of the diffractive optical element 220 shown in FIG. 3 along the A-A cutting line.

Figure 5:
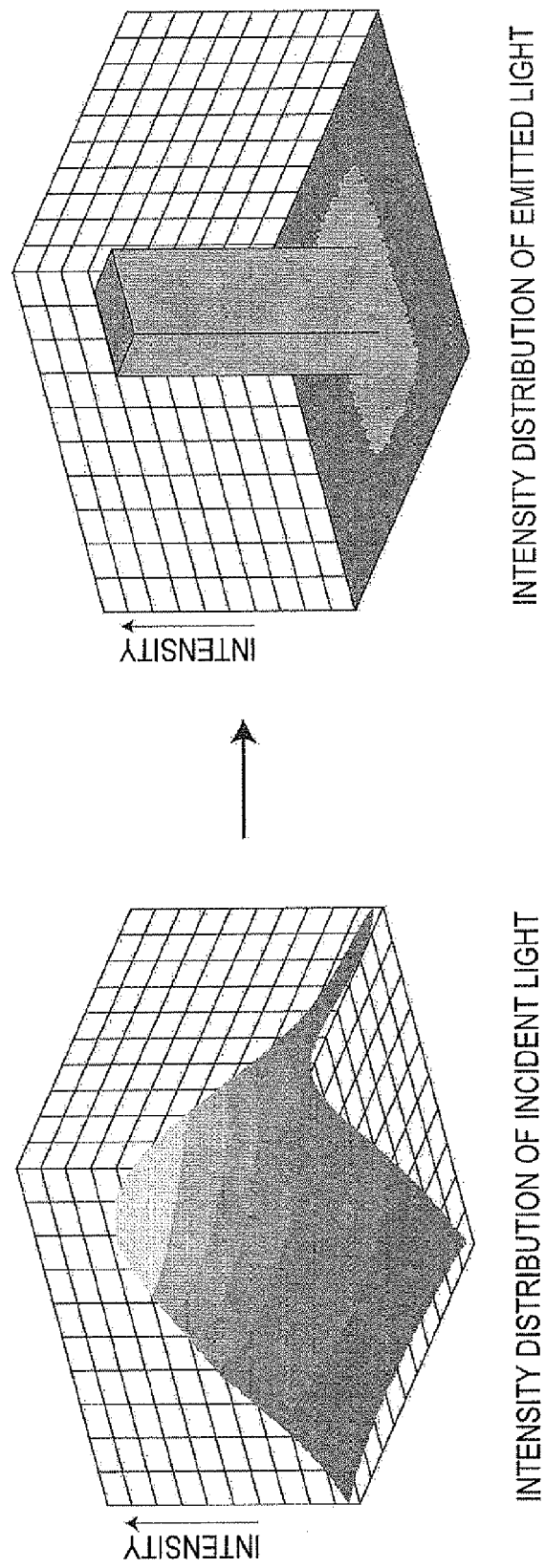
FIG. 5 is an explanatory diagram of a function of the diffractive optical element in the first embodiment of the invention.

FIG. 5 shows an explanatory diagram of a function of the diffractive optical element 220 in the first embodiment. In FIG. 5, the vertical axes represent the intensity of the incident light in each of the pixels of the entrance surface of the diffractive optical element 220 and the intensity of the emitted light in each of the pixels of the exit surface thereof, respectively.

The LC-CGH as the diffractive optical element 220 is capable of varying the refractive index to the light transmitted therethrough by each of the pixels corresponding to the image to be displayed. The image processing device 100 generates the diffractive optical element control signal based on a diffraction pattern for designating the refractive index for each of the pixels as shown in FIG. 3. The LC-CGH is supplied with the diffractive optical element control signal from the image processing device 100. The LC-CHG is arranged to be supplied with an application voltage to each of the pixels based on the diffractive optical element control signal, thus the refractive index to the light transmitted through each of the pixels is varied.

The diffraction pattern is generated by executing predetermined arithmetic processing on, for example, image signal (luminance component) of the image. As the arithmetic processing, there can be cited an iterative Fourier transform algorithm known to the public, for example. The image processing device 100 executes the iterative Fourier transform algorism on the luminance component of the image signal to generate the diffraction pattern, thus generating the diffractive optical element control signal corresponding to the diffraction pattern.

As a result, the refractive index of each of the pixels of the LC-CHG is varied, and phase differences are caused in the emitted light beams transmitted through the LC-CGH. The emitted light beams thus provided with the phase differences interfere with each other, thus the intensity distribution in the emitted light beams is formed. Therefore, by preparing the predetermined diffraction pattern, there can be obtained the intensity distribution (luminance distribution) of the emitted light beams in which a predetermined area has higher intensity than the other area with respect to the intensity distribution of the incident light, such that only a predetermined area has intensity as shown in FIG. 5.

On this occasion, since no other process than the process of diffracting the incident light beam by the diffractive optical element 220 is executed, the amount of light of the incident light beam can be used for other areas in the image, thus it becomes possible to enhance the efficiency of the light beam.

Going back to FIG. 2, the explanation is continued therefrom. The diffracted light beams obtained by the diffractive optical element 220 provided with the function described above are emitted to the dichroic mirror 242.

The dichroic mirror 242 reflects the light beams of the R component color out of the diffracted light beams obtained by the diffractive optical element 220 to guide it to the mirror 246, and transmits the light beams of the G component and the B component colors. The mirror 246 totally reflects the light beams reflected by the dichroic mirror 242 to guide them to the collimating lens 256R. The collimating lens 256R converts the light beams thus input into collimated light beams, and outputs them to the R light modulation element 230R. The R light modulation element 230R executes the light modulation on the collimated light beams from the collimating lens 256R based on the image signal from the image processing device 100, and outputs the modulated light beams to the dichroic prism 258.

The dichroic mirror 244 totally reflects the light beams with the G component out of the light beams transmitted through the dichroic mirror 242 to guide them to the collimating lens 256G, and transmits the light beams with the B component. The collimating lens 256G converts the light beams thus input into collimated light beams, and outputs them to the G light modulation element 230G. The G light modulation element 230G executes the light modulation on the collimated light beams from the collimating lens 256G based on the image signal from the image processing device 100, and outputs the modulated light beams to the dichroic prism 258.

The mirror 248 totally reflects the light beams with the B component transmitted through the dichroic mirror 244 to guide them to the mirror 250. The mirror 250 totally reflects the light beams from the mirror 248 to guide them to the collimating lens 256B. The collimating lens 256B converts the light beams thus input into collimated light beams, and outputs them to the B light modulation element 230B. The B light modulation element 230B executes the light modulation on the collimated light beams from the collimating lens 256B based on the image signal from the image processing device 100, and outputs the modulated light beams to the dichroic prism 258. Since the light path length of the light beams with the B component transmitted through the dichroic mirror 244 is different from the light path lengths of the light beams with the other components, the R component and the G component, the relay lenses 252, 254 perform correction for making the difference between the optical distances between the light sources and the light modulation elements of the respective color components as small as possible.

The dichroic prism 258 has a function of outputting the combination light beams obtained by combining the incident light beams from the light modulation elements 230R, 230G, and 230B as emitted light beams. The projection lens 260 is a lens for imaging the output image on a screen not shown in an enlarged manner.

As described above, the image display device 200 in the first embodiment is provided with the diffractive optical element disposed between the light sources and the light modulation elements. Therefore, since the image can be displayed by executing the light modulation on the diffracted light beams, which are obtained by diffracting the light beams from the light sources so as to have a desired luminance distribution, based on the image signal, and thus the amount of light from the light sources can be used for other areas of the image, the efficiency of light beams can be enhanced. Therefore, according to the first embodiment, it becomes possible to reduce an amount of heat generated by the image display device 200, thus achieving cost reduction by decreasing the number of components and reduction of the power consumption.

Further, according to the first embodiment, since it is eliminated to control the light intensity uniformly through the entire screen, even in the case in which a luminescent spot (a light source or a glossy area) exists in the image, for example, it becomes possible to prevent the luminance of the luminescent spot from being lowered, or it becomes possible to prevent a so-called grayish black picture from occurring.

Further, even in the case in which the content is displayed on the screen with so-called black belts on the top and the bottom of the screen because of mismatch between the aspect ratio of the image displayed on the image display device 200 and the aspect ratio of the image of the content, since it is eliminated to control the light intensity uniformly through the entire screen according to the first embodiment, it is prevented that the luminance of the black belts varies depending on the image to be displayed. Therefore, it becomes possible to prevent the case in which a part of the image, which should be displayed with a constant luminance in a normal condition, is displayed as an unnatural image with the luminance varied in accordance with the variation of the image.

Further, according to the first embodiment, it is possible to lower the output of the light source to the limit in accordance with the input image signal without deteriorating the quality of the image, and to achieve reduction of the power consumption of the image display device in addition to the prevention of deterioration of the image quality.

Then, the image processing device 100 in the first embodiment provided with the diffractive optical element and controlling it so as to use the amount of light thus reduced for the other areas in the image will be explained.

Figure 6:
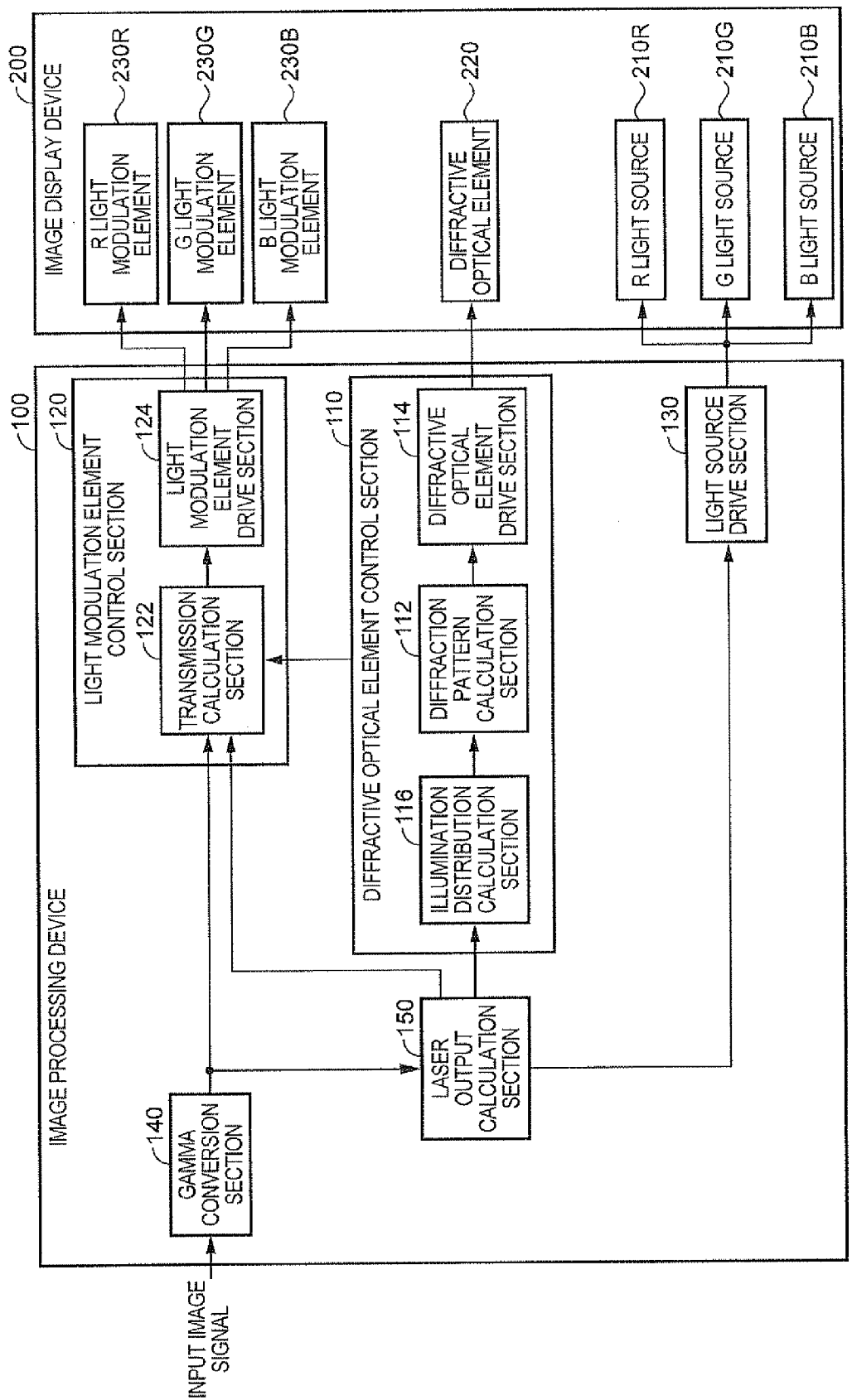
FIG. 6 is a block diagram of a configuration example of an image processing device according to the first embodiment of the invention.

FIG. 6 shows a block diagram of a configuration example of the image processing device 100 according to the first embodiment. In FIG. 6, in order for making it easy to understand the configuration of the image processing device 100, a substantial part of the image display device 200 shown in FIG. 2 is also shown in addition thereto. In FIG. 6, the same parts as those shown in FIG. 1 or 2 are denoted with the same reference numerals, and the explanation therefor will be omitted if appropriate.

The image processing device 100 receives the image signal generated by the image signal generation device 20 shown in FIG. 1 as an input image signal. Then, the image processing device 100 generates a control signal (the image signal) for controlling the R light modulation element 230R, the G light modulation element 230G, and the B light modulation element 230B of the image display device 200, the diffractive optical element control signal for controlling the diffractive optical element 220 of the image display device 200, and a control signal for controlling the R light source 210R, the G light source 210G, and the B light source 210B of the image display device 200 based on the input image signal, and outputs the signals to the image display device 200.

The image processing device 100 includes a diffractive optical element control section 110 for controlling the diffractive optical element 220 of the image display device 200, and a light modulation element control section 120 for controlling the light modulation elements 230 (the R light modulation element 230R, the G light modulation element 230G, and the B light modulation element 230B) of the image display device 200. The diffractive optical element control section 110 generates the diffractive optical element control signal for controlling the diffraction characteristic of the diffractive optical element 220 based on the input image signal. The light modulation element control section 120 controls the modulation characteristics of the light modulation elements 230 (the R light modulation element 230R, the G light modulation element 230G, and the B light modulation element 230B) based on the input image signal.

According to the operations described above, it becomes possible for the diffractive optical element 220 to diffract the light beams from the light source so that the light beams have a luminance distribution corresponding to the input image signal. Further, by modulating the light beams, thus diffracted, based on the input image signal, the image display is realized. Thus, the control for making it possible to use the light beams from the light sources, which is normally reduced for expressing a dark part of the image, as the light for the other part in the image becomes possible.

More specifically, the diffractive optical element control section 110 includes a diffraction pattern calculation section (a diffraction pattern generation section, in the broad sense) 112 for generating the diffraction pattern of the diffractive optical element 220 based on the input image signal, and a diffractive optical element drive section 114 for controlling the diffractive optical element 220 based on the diffraction pattern, and thus the diffractive optical element control section 110 controls the diffractive optical element 220 based on the diffraction pattern. The diffraction pattern calculation section 112 is capable of generating the diffraction pattern by executing the iterative Fourier transform algorism known to the public on the input image signal.

Thus, the process for using the light beams from the light sources, which is normally reduced for expressing a dark part of the image, as the light for the other part in the image can be simplified using the diffraction pattern for the diffractive optical element 220.

More specifically, the diffractive optical element control section 110 includes an illumination distribution calculation section 116 for calculating an ideal illumination distribution (an illumination distribution, in the broad sense) of the light beams emitted to the light modulation elements based on the input image signal, and the diffraction pattern calculation section 112 generates the diffraction pattern corresponding to the ideal illumination distribution. In other words, the diffraction pattern is a pattern for realizing the ideal illumination distribution. Therefore, the light modulation element control section 120 preferably controls the light modulation elements based on the illumination distribution obtained from the diffraction pattern generated by the diffraction pattern calculation section 112. However, since the diffraction pattern is generated based on the ideal illumination distribution as described later, it is also possible to control the light modulation elements based on the ideal illumination distribution for the purpose of simplification of the process.

Meanwhile, the light modulation element control section 120 includes a transmission calculation section 122 and a light modulation element drive section 124. The transmission calculation section 122 calculates the transmission of each of the R light modulation element 230R, the G light modulation element 230G, and the B light modulation element 230B. The transmission calculation section 122 calculates the transmission of each of the light modulation elements based on the luminance distribution of the input image signal and the illumination distribution (the ideal illumination distribution or the actual illumination distribution obtained from the diffraction pattern corresponding to the ideal illumination distribution). The light modulation element drive section 124 controls each of the R light modulation element 230R, the G light modulation element 230G, and the B light modulation element 230B so that the transmission obtained by the transmission calculation section 122 is achieved.

Further, the image processing device 100 can include a light source drive section 130. The light source drive section 130 controls the intensity of the light beams emitted from the light sources (the R light source 210R, the G light source 210G, and the B light source 210B) to the diffractive optical element 220. Further, in the first embodiment, since the single diffractive optical element 220 is used commonly to the plurality of color components, the light source drive section 130 controls each of the light sources provided for the respective color components so as to align the intensity of the light beams from the respective light sources.

The image processing device 100 can further include a gamma conversion section 140 and a laser output calculation section 150.

The gamma conversion section 140 executes a process for converting the signal form of the input image signal. In the first embodiment, it is assumed that the gamma conversion section 140 converts the input image signal of, for example, the RGB format into the luminance in order for controlling the illumination distribution, the transmission, and the intensity of the light sources based on the luminance distribution. The image signal on which the gamma conversion is executed by the gamma conversion section 140 is output to the light modulation element control section 120 and the laser output calculation section 150.

The laser output calculation section 150 calculates the outputs of the laser sources respectively forming the R light source 210R, the G light source 210G and the B light source 210B based on the image signal converted into the luminance component by the gamma conversion section 140. The transmission calculation section 122 obtains the transmission using the luminance distribution of the input image signal obtained by the laser output calculation section 150. Further, the illumination distribution calculation section 116 calculates the illumination distribution of the light beams emitted from the light sources to the light modulation elements using the luminance distribution of the input image signal obtained by the laser output calculation section 150. The light source drive section 130 drives the light sources based on the luminance distribution of the input image signal obtained by the laser output calculation section 150.

Figure 7:
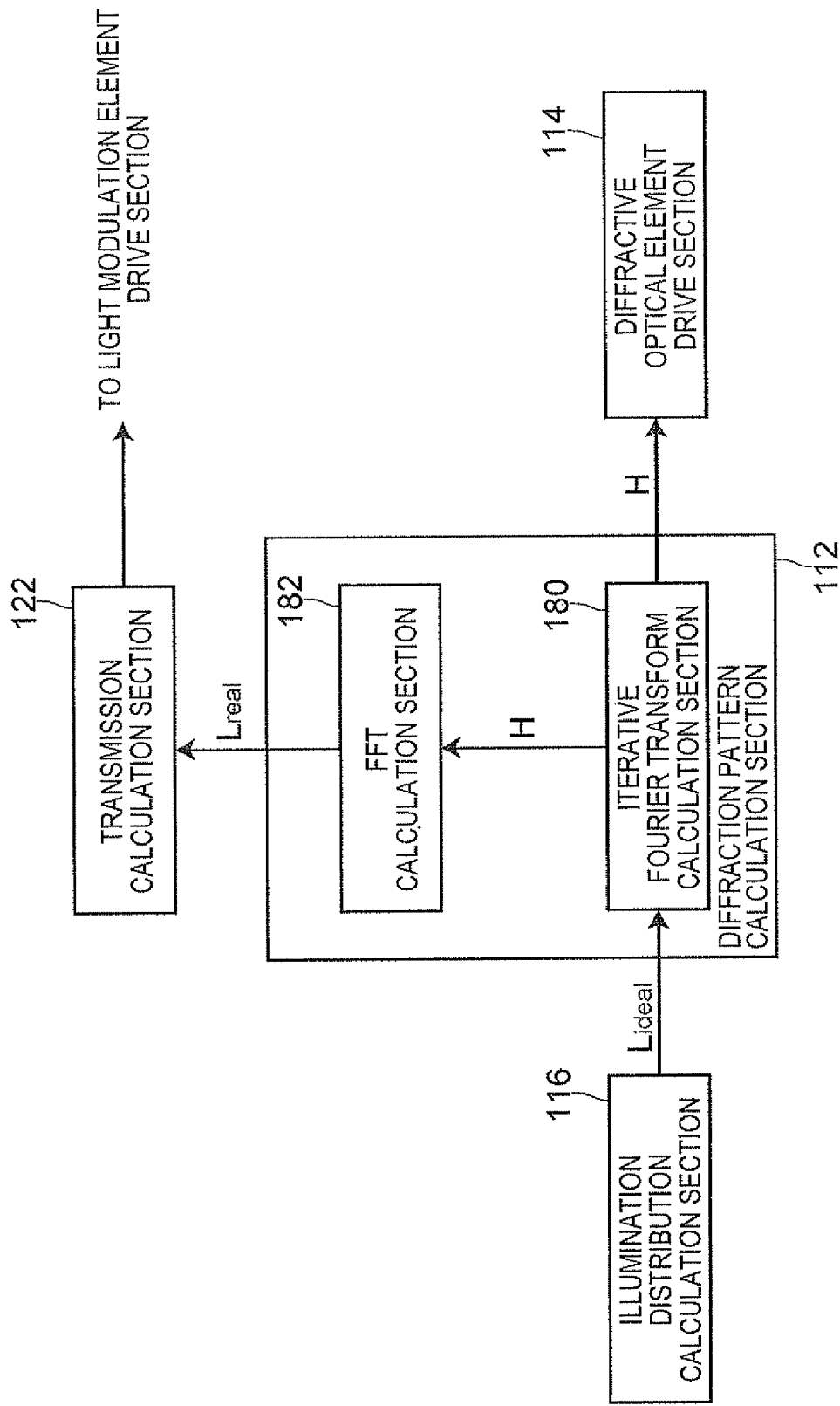
FIG. 7 is a block diagram of a configuration example of a substantial part of the image processing device shown in FIG. 6.

FIG. 7 shows a block diagram of a configuration example of a substantial part of the image processing device 100 shown in FIG. 6. In FIG. 7, the same parts as those shown in FIG. 6 are denoted with the same reference numerals, and the explanation therefor will be omitted if appropriate.

FIG. 7 represents a configuration example of the diffraction pattern calculation section 112. The diffraction pattern calculation section 112 includes an iterative Fourier transform calculation section 180 and a fast Fourier transform (FFT) calculation section 182. The iterative Fourier transform calculation section 180 executes the iterative Fourier transform calculation on the ideal illumination distribution $L_{ideal}$(x,y) obtained by the illumination distribution calculation section 116, thereby obtaining the diffraction pattern H(x,y) for each of the pixels.

The diffraction pattern H(x,y) obtained by the iterative Fourier transform calculation section 180 is output to the FFT calculation section 182 and the diffractive optical element drive section 114.

The FFT calculation section 182 executes the FFT calculation on the diffraction pattern of one frame using the diffraction pattern H(x,y) obtained by the iterative Fourier transform calculation section 180, thereby obtaining the actual illumination distribution $L_{real}$(x,y). The actual illumination distribution $L_{real}$(x,y) is output to the transmission calculation section 122. The transmission calculation section 122 obtains the transmission of the light modulation sections using the actual illumination distribution $L_{real}$(x,y).

As described above, in the first embodiment, since the diffractive optical element 220 used commonly to the color components of RGB is provided, the intensities of the light beams of the respective color components emitted from the light sources to the diffractive optical element 220 are made equal to each other, and the control is arranged to be performed independently for each of the color components in each of the light modulation element of the respective color components. Therefore, it becomes possible to control the image display device 200 using the light from the light source, which is normally reduced for expressing a dark part of the image, as the light for the other part of the image without providing the diffractive optical element 220 for each of the color components.

Then, an operational example of the image processing device 100 having the configuration shown in FIGS. 6 and 7 will be explained.

Figure 8:
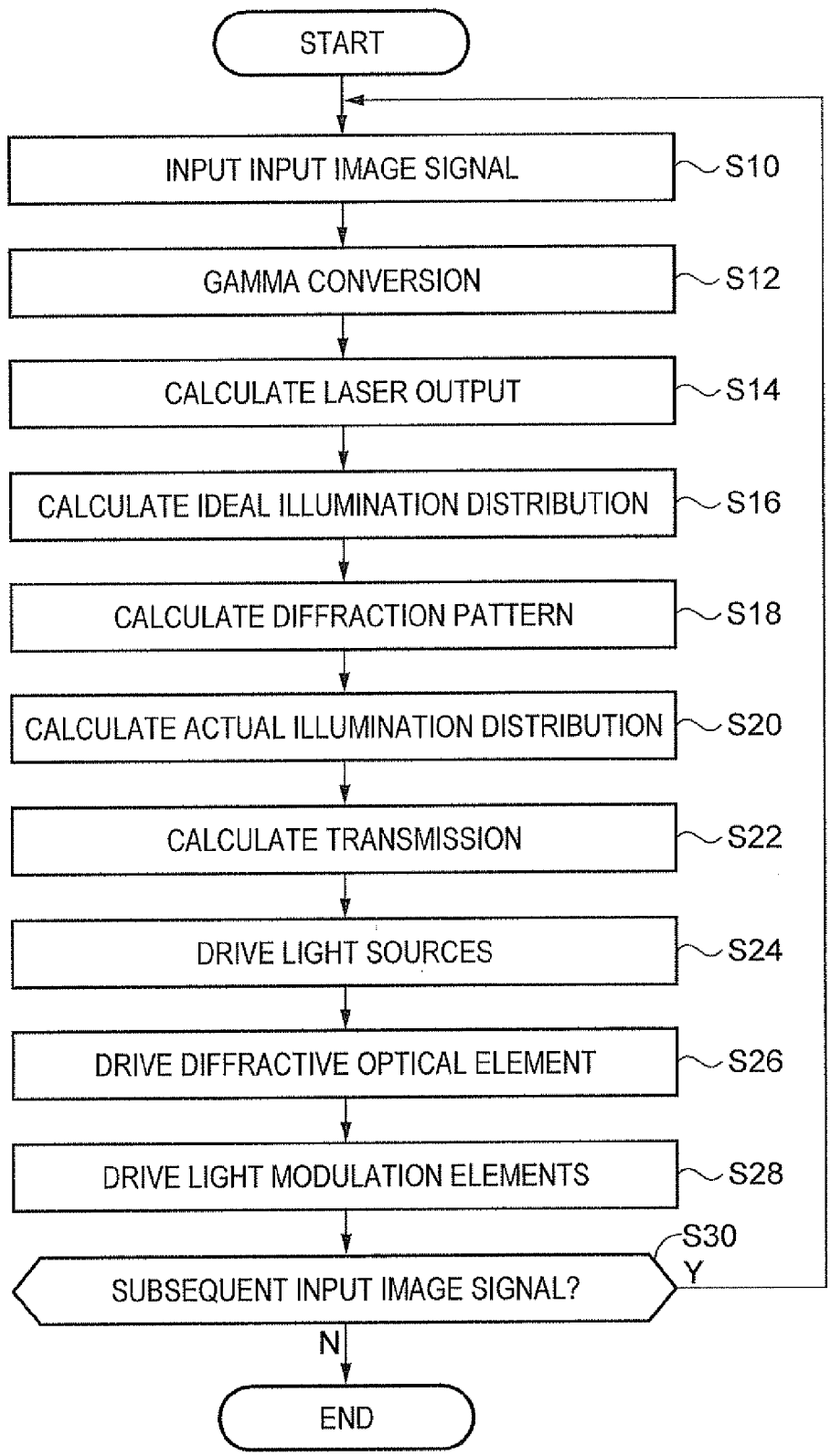
FIG. 8 is a flowchart of a processing example of the image processing device according to the first embodiment of the invention.

FIG. 8 shows a flowchart of a process example of the image processing device 100 according to the first embodiment.

Firstly, the image signal generated by the image signal generation device 20 is input to the image processing device 100 as the input image signal (step S10). Although the explanation will hereinafter be presented assuming that the input image signal is a signal of the RGB format, the input image signal according to the embodiments of the invention is not limited to the signal of the RGB format. For example, in the case in which the input image signal is a signal of another format of the RGB format, the process as described below can be realized by converting the input image signal into a signal of the RGB format once when the input image signal is input to the image processing device 100.

Subsequently, the gamma conversion section 140 of the image processing device 100 converts the input image signal of the RGB format into the luminance $Y_R$, $Y_G$, and $Y_B$ of the respective color components (step S12). More specifically, the gamma conversion section 140 obtains the normalized luminance $Y_R$, $Y_G$, and $Y_B$ of the respective color components for each of the pixels along the following formula.

$$Y_R(x,y)=(R/R_{max})^\gamma$$

$$Y_G(x,y)=(G/G_{max})^\gamma$$

$$Y_B(x,y)=(B/B_{max})^\gamma$$

In the above formula, (x,y) represents a coordinate position of the pixel in the image, R represents the luminance signal of the R component of the pixel, $R_{max}$ represents the maximum value of the luminance signal of the R component, and γ is a constant representing a gray-scale characteristic. It should be noted that γ is determined by the standard of the image signal, and has the same value (normally 1.8 through 2.4) throughout the R component, the G component, and the B component. Such luminance $Y_R$(x,y), $Y_G$(x,y), and $Y_B$(x,y) is supplied to the light modulation element control section 120 and the laser output calculation section 150.

Subsequently, the laser output calculation section 150 obtains the laser output P of each of the light sources of the R light source 210R, the G light source 210G, and the B light source 210B from the luminance $Y_R$(x,y), $Y_G$(x,y), and $Y_B$(x, y) obtained by the gamma conversion section 140 (step S14). More specifically, the laser output calculation section 150 obtains the laser output P along the following formula so that all of the light sources have the same value and that the output becomes the minimum value required for displaying the input image.

$$P = \frac{1}{N}\sum_{x,y} Y_{max}(x, y)$$

$$Y_{max}(x, y) = \max[Y_R(x, y), Y_G(x, y), Y_B(x, y)]$$

In the above formula, N represents the number of pixels (e.g., N=$x_{max} \times y_{max}$) of the input image signal, max[ ] represents the maximum value of the values inside the brackets [ ]. Therefore, the maximum value of the luminance of the RGB is obtained for each of the pixels, and then the maximum values thus obtained are accumulated throughout the screen and then averaged, thereby the laser output P is obtained. Therefore, the laser output P takes a value between 0 and 1, and is output to the diffractive optical element control section 110, the light modulation element control section 120, and the light source drive section 130.

Subsequently, the illumination distribution calculation section 116 of the diffractive optical element control section 110 obtains the ideal illumination distribution $L_{ideal}$(x, y)

(step S16). More specifically, the illumination distribution calculation section 116 obtains the illumination distribution $L_{ideal}(x,y)$ to be emitted to the light modulation elements along the following formula for each of the pixels using the laser output P and the $Y_{max}(x,y)$.

$$L_{ideal}(x,y)=Y_{max}(x,y)/P$$

The illumination distribution $L_{ideal}(x,y)$ obtained by the above formula is output to the diffraction pattern calculation section 112.

The diffraction pattern calculation section 112 calculates the diffraction pattern H(x,y) from the illumination distribution $L_{ideal}(x,y)$ (step S18). More specifically, the diffraction pattern calculation section 112 executes predetermined arithmetic processing such as an iterative Fourier transform algorithm on the illumination distribution $L_{ideal}(x,y)$ for each of the pixels, thereby calculating the diffraction pattern H(x,y) as shown in the following formula.

$$H(x,y)=G(L_{ideal}(x,y))$$

In the above formula, the predetermined arithmetic processing such as the iterative Fourier transform algorithm is represented by a function G. The diffraction pattern H(x,y) thus calculated is output to the diffractive optical element drive section 114.

Further, the diffraction pattern calculation section 112 obtains the actual illumination distribution $L_{real}(x,y)$ using the diffraction pattern H(x, y) obtained in the step S18 (step S20). More specifically, the diffraction pattern calculation section 112 executes predetermined arithmetic processing such as an FFT on the diffraction pattern of one frame using the diffraction pattern H(x,y) obtained in the step S18, thereby obtaining the actual illumination distribution $L_{real}(x,y)$ as shown in the following formula.

$$L_{real}(x,y)=F(H(x,y))$$

In the above formula, the function of executing the predetermined arithmetic processing such as the Fourier transform throughout the entire pixels in one frame to obtain the actual illumination distribution for each of the pixels is represented as F. The actual illumination distribution $L_{real}(x,y)$ thus obtained is output to the transmission calculation section 122.

Subsequently, the transmission calculation section 122 of the light modulation element control section 120 obtains the transmission $T_R(x,y)$, $T_G(x,y)$, and $T_B(x,y)$ of the light modulation elements of the respective color components from the luminance $Y_R(x,y)$, $Y_G(x,y)$, and $Y_B(x,y)$ obtained in the step S12 and the actual illumination distribution $L_{real}(x,y)$ obtained in the step S20 (step S22).

$$T_R(x,y)=Y_R(x,y)/L_{real}(x,y)$$

$$T_G(x,y)=Y_G(x,y)/L_{real}(x,y)$$

$$T_B(x,y)=Y_B(x,y)/L_{real}(x,y)$$

The transmission $T_R(x,y)$, $T_G(x,y)$, and $T_B(x,y)$ obtained by the above formula is output to the light modulation element drive section 124.

Then, the light source drive section 130 drives each of the light sources based on the laser output P obtained in the step S14 so that all of the R light source 210R, the G light source 210G and the B light source 210B have the same intensity (step S24).

Further, the diffractive optical element drive section 114 generates the diffractive optical element control signal for controlling the diffractive optical element 220 based on the diffraction pattern H(x,y) obtained in the step S18, and outputs the signal to the diffractive optical element 220 (step S26). Thus, the light beams output from the R light source 210R, the G light source 210G, and the B light source 210B are diffracted when transmitted through the diffractive optical element 220, and realize the illumination distribution $L_{real}(x,y)$ on the R light modulation element 230R, the G light modulation element 230G, and the B light modulation element 230B, respectively.

Subsequently, the light modulation element drive section 124 drives each of the light modulation elements, the R light modulation element 230R, the G light modulation element 230G, and the B light modulation element 230B, so that the transmission obtained in the step S22 is achieved (step S28). Thus, the light beams emitted respectively to the R light modulation element 230R, the G light modulation element 230G, and the B light modulation element 230B are modulated, and the image is output.

Subsequently, if there is another input image signal to be processed subsequently (Y in the step S30), the process returns to the step S10, and the process is continued. On the other hand, if there is no input image signal to be processed subsequently (N in the step S30), the series of processes are terminated (END).

It should be noted that the process of the image processing device 100 according to the first embodiment can be realized by hardware such as a gate-array or a dedicated circuit, or by a software process.

Figure 9:
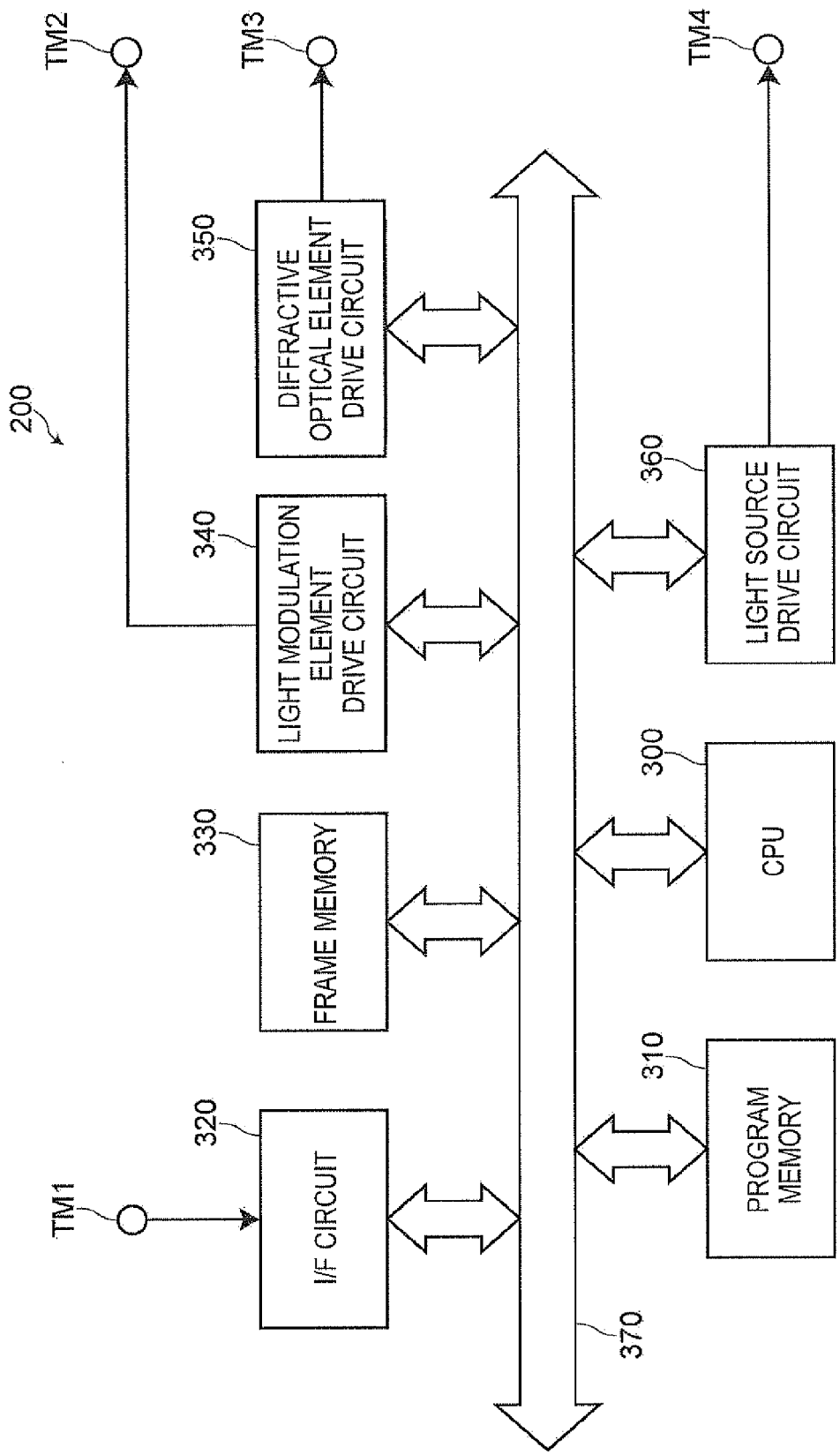
FIG. 9 is a block diagram of a hardware configuration example of the image processing device according to the first embodiment of the invention.

FIG. 9 shows a block diagram of a hardware configuration example of the image processing device 100 according to the first embodiment.

The image processing device 100 shown in FIG. 6 can include a central processing unit (hereinafter referred to as CPU) 300, a program memory 310, an interface (hereinafter referred to as I/F) circuit 320, a frame memory 330, a light modulation element drive circuit 340, a diffractive optical element drive circuit 350, and a light source drive circuit 360. In the image processing device 100, the CPU 300 is electrically connected to the program memory 310, the I/F circuit 320, the frame memory 330, the light modulation element drive circuit 340, the diffractive optical element drive circuit 350, and the light source drive circuit 360 via a bus 370.

The CPU 300 controls each of the program memory 310, the I/F circuit 320, the frame memory 330, the light modulation element drive circuit 340, the diffractive optical element drive circuit 350, and the light source drive circuit 360 via the bus 370. The program memory 310 stores a program corresponding to the control content of the CPU 300. The I/F circuit 320 performs an interface process with the image signal generation device 20, and is provided with the image signal from the image signal generation device 20 input thereto via an input terminal TM1. The frame memory 330 stores the image signal, and also functions as a working memory.

The light modulation element drive circuit 340 outputs the image signal and a control signal via an output terminal TM2 to perform drive control of the R light modulation element 230R, the G light modulation element 230G, and the B light modulation element 230B along the content of the control by the CPU 300. The diffractive optical element drive circuit 350 outputs a control signal via an output terminal TM3 to control the diffraction characteristic of the diffractive optical element 220 along the content of the control by the CPU 300. The light source drive circuit 360 outputs a control signal via an output terminal TM4 to perform control of varying the intensity of emission of the R light source 210R, the G light source 210G, and the B light source 210B along the content of the control by the CPU 300.

As described above, the program memory 310 previously stores a program for realizing the process shown in FIG. 8, and by the CPU 300 retrieving the program stored in the program memory 310 and executing the process corresponding to the program, the process of the image processing device 100 according to the first embodiment can be realized by the software process.

It should be noted that the image processing device 100 according to the first embodiment is not limited to the configurations shown in FIGS. 6 and 7.

Figure 10:
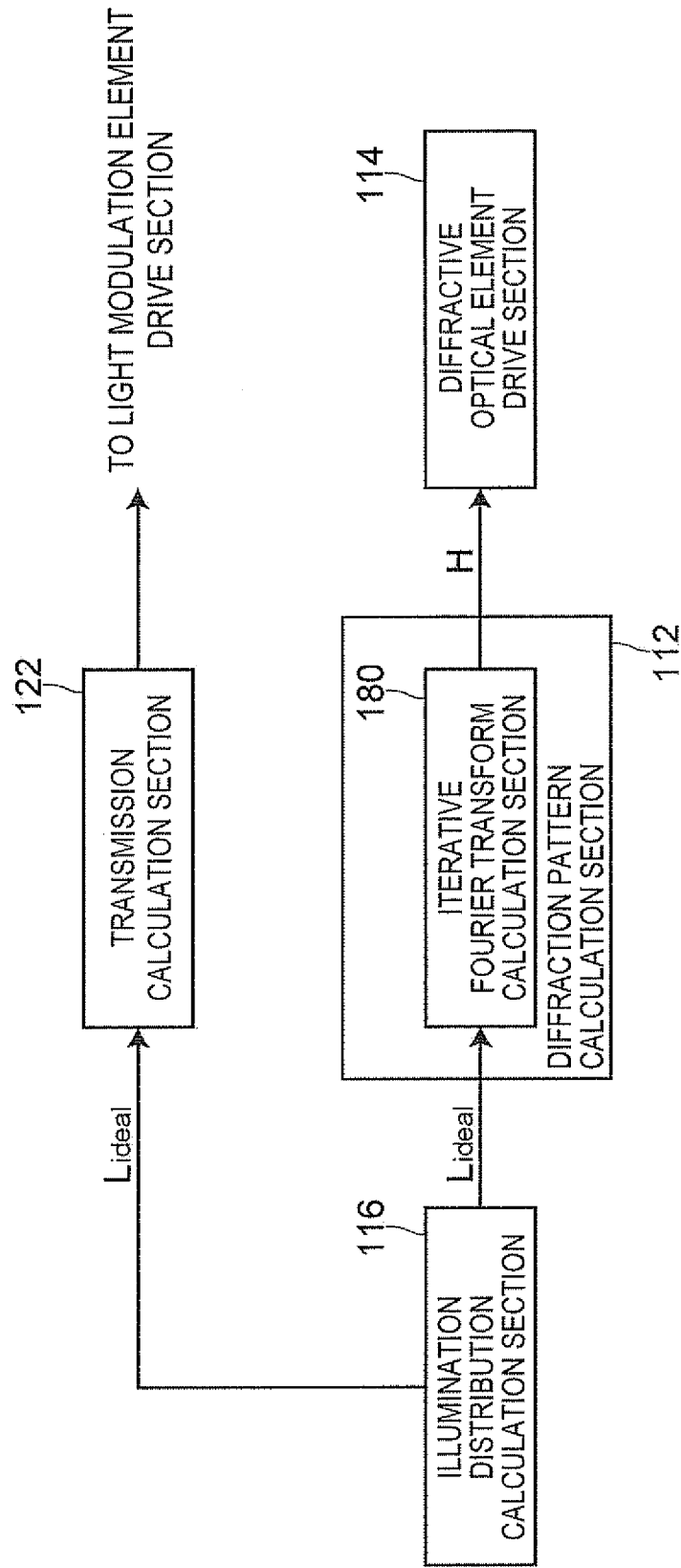
FIG. 10 is a block diagram of a configuration example of a substantial part of the image processing device according to a modified example of the first embodiment of the invention.

FIG. 10 shows a block diagram of a configuration example of a substantial part of the image processing device 100 according to a modified example of the first embodiment. In FIG. 10, the same parts as those shown in FIG. 7 are denoted with the same reference numerals, and the explanation therefor will be omitted if appropriate.

The configuration of the image processing device 100 according to the modified example of the first embodiment is the same as that shown in FIG. 6. It should be noted that as shown in FIG. 10, the diffraction pattern calculation section 112 is provided only with the iterative Fourier transform calculation section 180, and does not calculate the actual illumination distribution $L_{real}$. Further, it is arranged that the ideal illumination distribution $L_{ideal}$ obtained by the illumination distribution calculation section 116 is directly output to the transmission calculation section 122. The transmission calculation section 122 calculates the transmission of the light modulation element using the ideal illumination distribution $L_{ideal}$ obtained by the illumination distribution calculation section 116.

Figure 11:
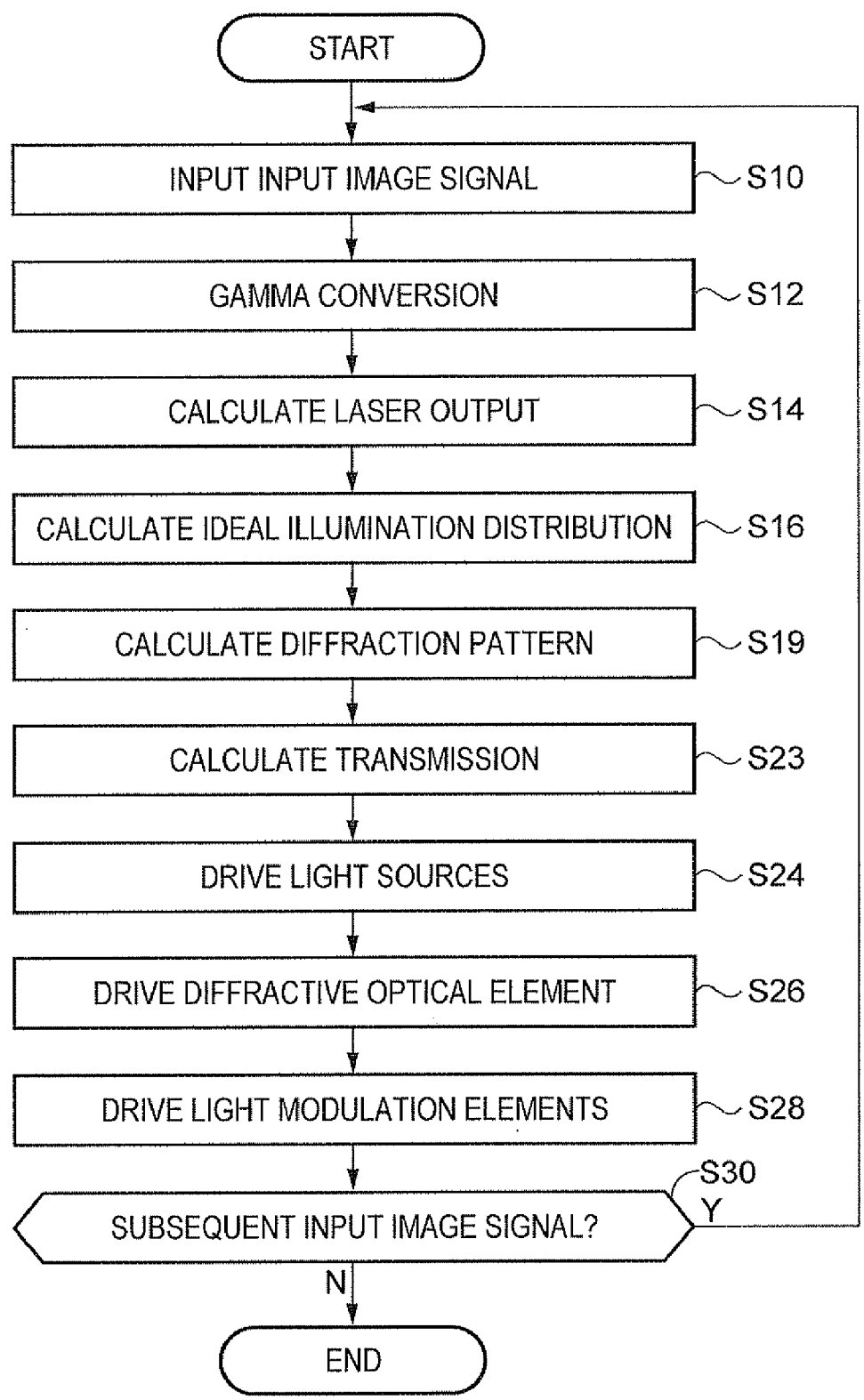
FIG. 11 is a flowchart of a processing example of the image processing device according to the modified example of the first embodiment of the invention.

FIG. 11 shows a flowchart of a process example of the image processing device 100 according to the modified example of the first embodiment. In FIG. 11, the same parts as those shown in FIG. 8 are denoted with the same reference numerals, and the explanation therefor will be omitted if appropriate.

The process shown in FIG. 11 is different from the process shown in FIG. 8 in that after the illumination distribution calculation section 116 obtains the ideal illumination distribution $L_{ideal}(x,y)$ in the step S16, the diffraction pattern calculation section 112 obtains the diffraction pattern $H(x,y)$ (step S19), the transmission calculation section 122 calculates the transmission of each of the light modulation elements (step S23) using the ideal illumination distribution $L_{ideal}(x,y)$.

In other words, the ideal illumination distribution $L_{ideal}(x,y)$ obtained in the step S16 is output to the diffraction pattern calculation section 112 and the transmission calculation section 122. Therefore, the transmission calculation section 122 calculates the transmission $T_R(x,y)$, $T_G(x,y)$, and $T_B(x,y)$ using the ideal illumination distribution $L_{ideal}(x,y)$ instead of the actual illumination distribution $L_{real}(x,y)$.

According to such a modified example of the first embodiment, since it is not required for the diffraction pattern calculation section 112 to execute the Fourier transform calculation on the diffraction pattern $H(x,y)$ obtained by the iterative Fourier transform calculation section 180 to obtain the actual illumination distribution $L_{real}(x,y)$, in the case in which, for example, an error between the ideal illumination distribution $L_{ideal}(x,y)$ and the actual illumination distribution $L_{real}(x,y)$ is small, the processing load of the image processing device 100 can significantly be reduced.

As explained hereinabove, according to the first embodiment or the modified example thereof, in the case in which the image is displayed by executing the light modification corresponding to the image signal on the diffracted light beam obtained by diffracting the light beam from the light source so as to have a desired luminance distribution, it becomes possible to perform control for making it possible to use the amount of the light from the light source for other part of the image. Therefore, the light efficiency in the image display device 200 can be enhanced. Therefore, according to the first embodiment, it becomes possible to provide an image processing device 100 capable of reducing an amount of heat generated by the image display device 200, thus achieving cost reduction by decreasing the number of components and reduction of the power consumption.

Further, according to the first embodiment or the modified example thereof, since it is eliminated to control the light intensity uniformly through the entire screen, it becomes possible to provide the image processing device 100, which performs control, even in the case in which a luminescent spot (a light source or a glossy area) exists in the image, for example, of preventing the luminance of the luminescent spot from being lowered, or preventing a so-called grayish black picture from occurring.

Further, even in the case in which the content is displayed on the screen with so-called black belts on the top and the bottom of the screen because of mismatch between the aspect ratio of the image displayed on the image display device 200 and the aspect ratio of the image of the content, according to the first embodiment or the modified example thereof, it becomes possible to provide the image processing device 100 capable of performing the control for preventing the luminance of the black belts from varying depending on the image to be displayed.

Further, according to the first embodiment and the modified example thereof, it becomes possible to provide the image processing device 100 capable of lowering the output of the light source to the limit in accordance with the input image signal without deteriorating the quality of the image, and achieving reduction of the power consumption of the image display device in addition to the prevention of deterioration of the image quality.

Second Embodiment

Although in the first embodiment it is configured that the diffractive optical element 220 is used commonly to the R light source 210R, the G light source 210G, and the B light source 210B in the image display device 200, the invention is not limited to this configuration.

Figure 12:
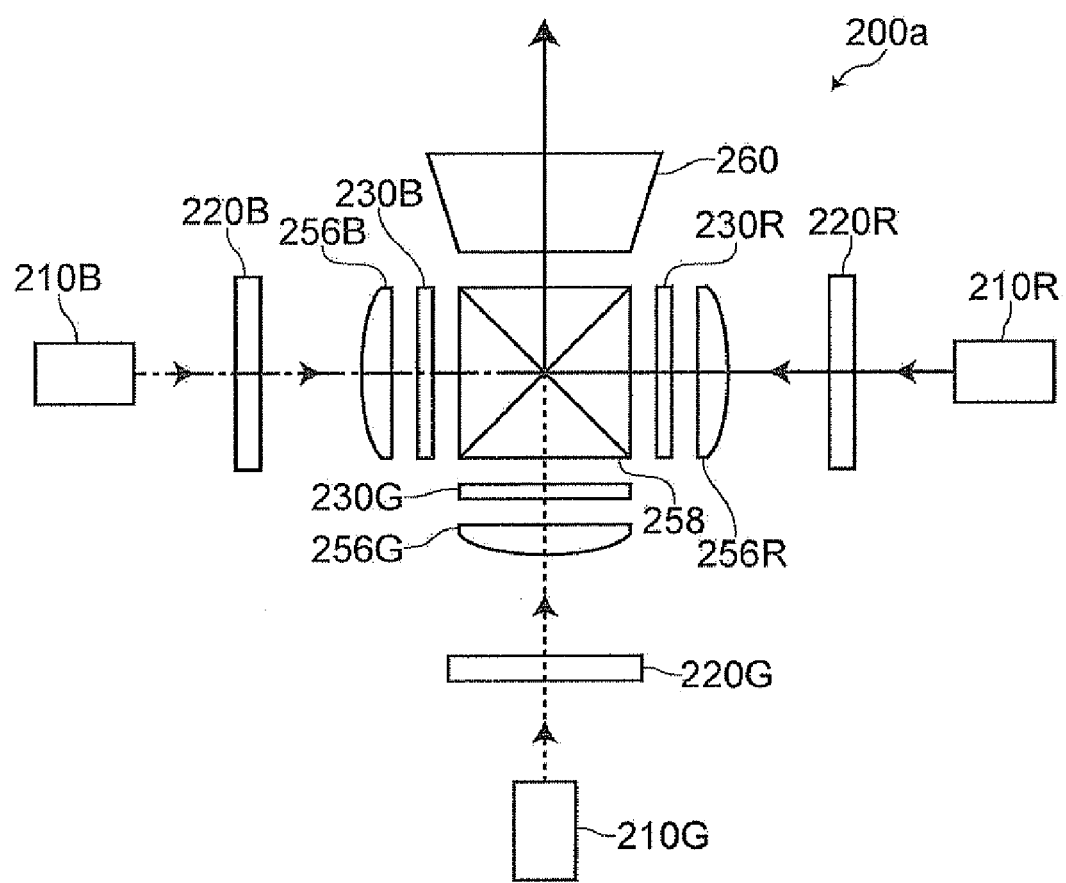
FIG. 12 is a block diagram of a configuration example of an image display system according to a second embodiment of the invention.

FIG. 12 shows a block diagram of a configuration example of the image display system according to the second embodiment of the invention. In FIG. 12, the same parts as those shown in FIG. 1 are denoted with the same reference numerals, and the explanation therefor will be omitted if appropriate.

The image display device 200a according to the second embodiment can also be applied to the image display system 10 shown in FIG. 1 instead of the image display device 200 shown in FIG. 1. The image display device 200a according to the second embodiment is different from the image display device 200 according to the first embodiment in that the diffractive optical elements are provided corresponding respectively to the color components in the second embodiment while the diffractive optical element is provided commonly to the plurality of color components in the first embodiment.

In other words, the image display device 200a includes a plurality of light sources provided respectively to color components, a plurality of diffractive optical elements provided respectively to the color components and irradiated with light beams from the respective light sources, and a plurality of light modulation elements provided respectively to the color components and for modulating diffracted light beams generated by the respective diffractive optical elements, and the diffraction characteristics of the respective diffractive optical elements are controlled based on diffractive optical element control signals provided thereto. In FIG. 12, as the plurality of light sources the R light source 210R, the G light source 210G, and the B light source 210B are provided, as the plurality of diffractive optical elements, an R diffractive optical element 220R, a G diffractive optical element 220G, and a B diffractive optical element 220B are provided, and as the plurality of light modulation elements, the R light modulation element 230R, the G light modulation element 230G, and the B light modulation element 230B are provided.

Further, each of the plurality of light sources is controlled in the light intensity for each of the color components, and the plurality of light modulation elements is controlled in the amount of modulation for each of the color components.

In FIG. 12, the light beam from the R light source 210R is input to the R diffractive optical element 220R as an incident light beam, and the R diffractive optical element 220R has a function of diffracting the light beam from the R light source 210R so that the light beam has a luminance distribution designated based on the (R) diffractive optical element control signal. The G diffractive optical element 220G is irradiated with the light from the G light source 210G as an incident light beam, and has a function of diffracting the light beam from the G light source 210G so that the light beam has a luminance distribution designated based on the (G) diffractive optical element control signal. Further, the B diffractive optical element 220B is irradiated with the light from the B light source 210B as an incident light beam, and has a function of diffracting the light beam from the B light source 210B so that the light beam has a luminance distribution designated based on the (B) diffractive optical element control signal.

As the R diffractive optical element 220R, the G diffractive optical element 220G, and the B diffractive optical element 220B, there can be cited an LC-CGH adopting a liquid crystal panel, for example. This liquid crystal panel is what is obtained by encapsulating a liquid crystal material as an electro-optic material between a pair of transparent glass plates, and diffracts the incident light using, for example, poly-silicon TFTs as switching elements so that the light has a diffraction pattern designated by the diffractive optical element control signal from the image processing device.

The R light modulation element 230R is irradiated with the diffracted light beam obtained by the R diffractive optical element 220R, and modulates the penetration (transmission, modulation rate) of the light of every pixel based on the (R) image signal from the image processing device. The G light modulation element 230G is irradiated with the diffracted light beam obtained by the G diffractive optical element 220G, and modulates the penetration (transmission, modulation rate) of the light of every pixel based on the (G) image signal from the image processing device. The B light modulation element 230B is irradiated with the diffracted light beam obtained by the B diffractive optical element 220B, and modulates the penetration (transmission, modulation rate) of the light of every pixel based on the (B) image signal from the image processing device.

As the R light modulation element 230R, the G light modulation element 230G, and the B light modulation element 230B, light valves each formed of a transmissive liquid crystal panel are adopted. The liquid crystal panel is what is obtained by encapsulating a liquid crystal material as an electro-optic material between a pair of transparent glass plates, and modulates the penetration of the light of each of the pixels in accordance with the image signal from the image processing device using, for example, poly-silicon TFTs as switching elements.

Also in the second embodiment, it is preferable that the R light source 210R, the G light source 210G, the B light source 210B are coherent light sources such as an LED using an electroluminescence effect or a laser source.

In FIG. 12, the collimating lens 256R converts the diffracted light beams obtained by the R diffractive optical element 220R into collimated light beams, and outputs them to the R light modulation element 230R. The R light modulation element 230R executes the light modulation on the collimated light beams from the collimating lens 256R based on the R image signal from the image processing device, and outputs the modulated light beams to the dichroic prism 258. The collimating lens 256G converts the diffracted light beams obtained by the G diffractive optical element 220G into collimated light beams, and outputs them to the G light modulation element 230G. The G light modulation element 230G executes the light modulation on the collimated light beams from the collimating lens 256G based on the G image signal from the image processing device, and outputs the modulated light beams to the dichroic prism 258. The collimating lens 256B converts the diffracted light beams obtained by the B diffractive optical element 220B into collimated light beams, and outputs them to the B light modulation element 230B. The B light modulation element 230B executes the light modulation on the collimated light beams from the collimating lens 256B based on the B image signal from the image processing device, and outputs the modulated light beams to the dichroic prism 258.

The dichroic prism 258 has a function of outputting the combination light beams obtained by combining the incident light beams from the light modulation elements 230R, 230G, and 230B as emitted light beams. The projection lens 260 is a lens for imaging the output image on a screen not shown in an enlarged manner.

Figure 13:
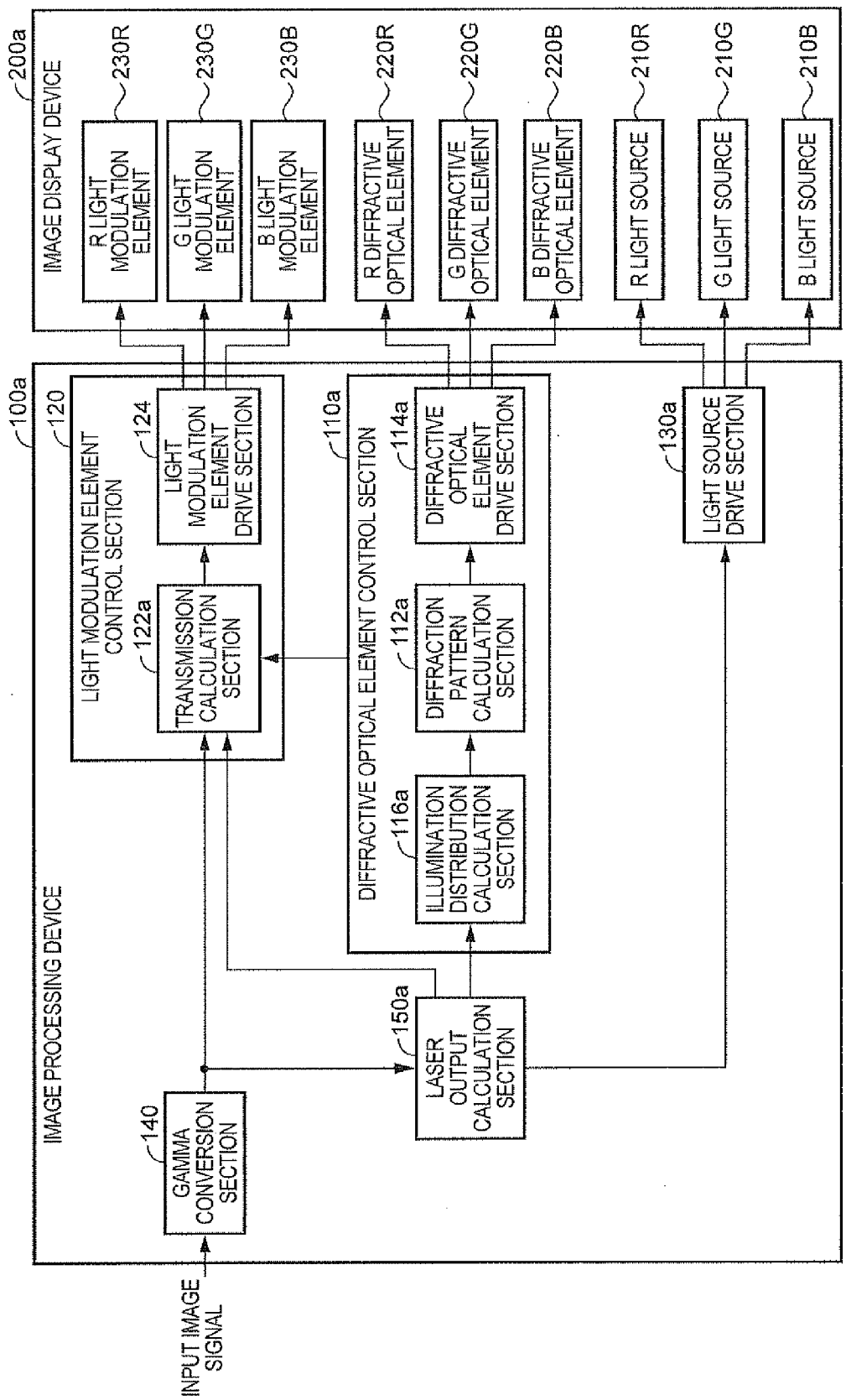
FIG. 13 is a block diagram of a configuration example of an image processing device according to the second embodiment of the invention.

FIG. 13 shows a block diagram of a configuration example of the image processing device according to the second embodiment. In FIG. 13, in order for making it easy to understand the configuration of the image processing device, a substantial part of the image display device 200a shown in FIG. 12 is also shown in addition thereto. In FIG. 13, the same parts as those shown in FIG. 6 are denoted with the same reference numerals, and the explanation therefor will be omitted if appropriate.

The image processing device 100a according to the second embodiment can also be applied to the image display system 10 shown in FIG. 1 instead of the image processing device 100 shown in FIG. 1. The image processing device 100a according to the second embodiment is different from the image processing device 100 according to the first embodiment in that the intensity of the light beam from the light source, the diffraction characteristic of the diffractive optical element, and an amount of modulation of the light modulation element can be controlled for each of the color components in the second embodiment while in the first embodiment the control for aligning the intensity of the light beams from the light sources throughout the color components is performed since the single diffractive optical element is used.

Therefore, the laser output calculation section 150a is capable of obtaining the laser output $P_R$, $P_G$, and $P_B$ of the respective light sources for the respective color components. Further, the illumination distribution calculation section 116a is also capable of obtaining the ideal illumination distributions $LR_{ideal}(x,y)$, $LG_{ideal}(x,y)$, and $LB_{ideal}(x,y)$ respectively for the color components. Further, the diffraction pattern calculation section 112a is also capable of obtaining the diffraction patterns $H_R(x,y)$, $H_G(x,y)$, and $H_B(x,y)$ respectively for the color components. Further, the diffractive optical element drive section 114a controls the diffraction characteristics of the diffractive optical elements provided respectively to the color components using the diffraction patterns obtained respectively for the color components by the diffraction pattern calculation section 112a. Similarly, the transmission calculation section 122a also calculates the transmissions respectively for the color components using the laser outputs obtained respectively for the color components.

It should be noted that the diffraction pattern calculation section 112a has substantially the same configuration as that shown in FIG. 7, and arranged to be capable of obtaining the diffraction patterns and the actual illumination distributions respectively for the color components.

The image processing device 100a according to the second embodiment described above includes the light source drive section 130a for controlling the intensity of the light beam emitted from the light source to the diffractive optical element, and in the case in which the diffractive optical element is provided to each of the color components, the light source drive section 130a can control the intensity of the light beams from the respective light sources independently for each of the color components.

Figure 14:
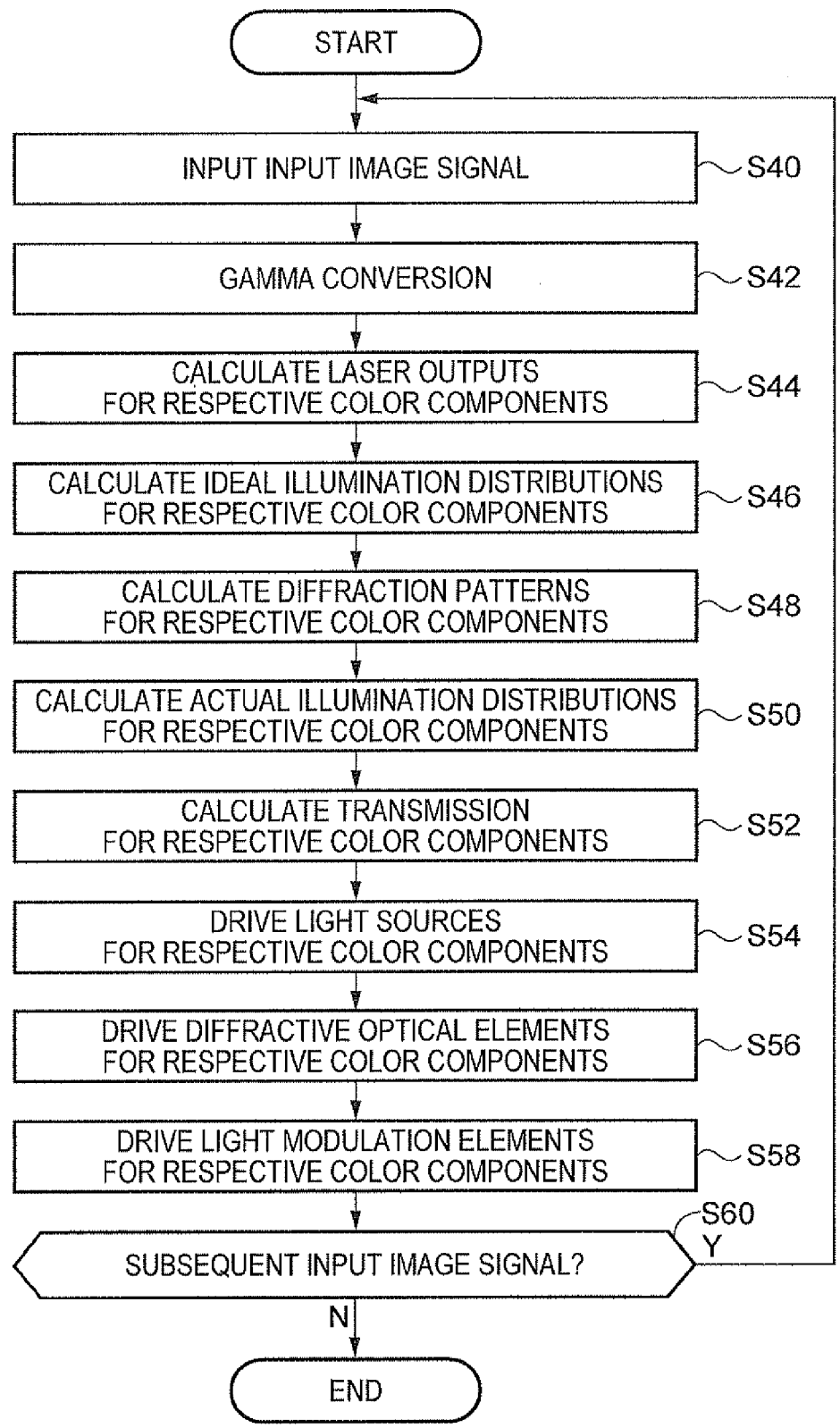
FIG. 14 is a flowchart of a processing example of the image processing device according to the second embodiment of the invention.

FIG. 14 shows a flowchart of a process example of the image processing device 100a according to the second embodiment.

Firstly, the image signal generated by the image signal generation device 20 is input to the image processing device 100a as the input image signal (step S40). Although the explanation will hereinafter be presented assuming that the input image signal is a signal of the RGB format, the input image signal according to the embodiments of the invention is not limited to the signal of the RGB format. For example, in the case in which the input image signal is a signal of another format of the RGB format, the process as described below can be realized by converting the input image signal into a signal of the RGB format once when the input image signal is input to the image processing device 100a.

Subsequently, the gamma conversion section 140 of the image processing device 100a converts the input image signal of the RGB format into the luminance $Y_R$, $Y_G$, and $Y_B$ of the respective color components (step S42). More specifically, the gamma conversion section 140 obtains the normalized luminance $Y_R$, $Y_G$, and $Y_B$ of the respective color components for each of the pixels. This process is the same as the step S12 shown in FIG. 8.

Subsequently, the laser output calculation section 150a obtains the laser outputs $P_R$, $P_G$, and $R_B$ of the respective light sources, the R light source 210R, the G light source 210G, and the B light source 210B respectively for the color components from the luminance $Y_R(x,y)$, $Y_G(x,y)$, and $Y_B(x,y)$ obtained by the gamma conversion section 140 (step S44). More specifically, the laser output calculation section 150a obtains the minimum laser outputs $P_R$, $P_G$, and $R_B$ of the respective light sources necessary for displaying the input image respectively for the color components along the following formula.

$$P_R = \frac{1}{N}\sum_{x,y} Y_R(x,y)$$

$$P_G = \frac{1}{N}\sum_{x,y} Y_G(x,y)$$

$$P_B = \frac{1}{N}\sum_{x,y} Y_B(x,y)$$

In the above formula, N represents the number of pixels (e.g., $N=x_{max} \times y_{max}$) of the input image signal, and $Y_R(x,y)$, $Y_G(x,y)$, and $Y_B(x,y)$ represent the luminance of the respective color components obtained in the step S42. The laser outputs $P_R$, $P_G$, and $P_B$ are output to the diffractive optical element control section 110a, the light modulation element control section 120, and the light source drive section 130a.

Subsequently, the illumination distribution calculation section 116a of the diffractive optical element control section 110a obtains the ideal illumination distributions $LR_{ideal}(x,y)$, $LG_{ideal}(x,y)$, and $LB_{ideal}(x,y)$ respectively for the color components (step S46). More specifically, the illumination distribution calculation section 116a obtains the illumination distributions $LR_{ideal}(x,y)$, $LG_{ideal}(x,y)$, and $LB_{ideal}(x,y)$ of the light beams emitted to the light modulation elements by pixel for the respective color components along the following formula using the laser outputs $P_R$, $P_G$, and $P_B$, and the luminance $Y_R(x,y)$, $Y_G(x,y)$, and $Y_B(x,y)$. The illumination distribution $LR_{ideal}(x,y)$ is an ideal illumination distribution for R, $LG_{ideal}(x,y)$ is an ideal illumination distribution for G, and $LB_{ideal}(x,y)$ is an ideal illumination distribution for B.

$$LR_{ideal}(x,y)=Y_R(x,y)/P_R$$

$$LG_{ideal}(x,y)=Y_G(x,y)/P_G$$

$$LB_{ideal}(x,y)=Y_G(x,y)/P_B$$

The illumination distributions $LR_{ideal}(x,y)$, $LG_{ideal}(x,y)$, and $LB_{ideal}(x,y)$ obtained by the above formula are output to the diffraction pattern calculation section 112a.

Subsequently, the diffraction pattern calculation section 112a calculates the diffraction patterns $H_R(x,y)$, $H_G(x,y)$, and $H_B(x,y)$ from the illumination distributions $LR_{ideal}(x,y)$, $LG_{ideal}(x,y)$, and $LB_{ideal}(x,y)$ respectively for the color components (step S48). More specifically, the diffraction pattern calculation section 112a executes predetermined arithmetic processing such as an iterative Fourier transform algorithm on the illumination distributions $LR_{ideal}(x,y)$, $LG_{ideal}(x,y)$, and $LB_{ideal}(x,y)$ for each of pixels, thereby calculating the diffraction patterns $H_R(x,y)$, $H_G(x,y)$, and $H_B(x,y)$ as shown in the following formula. The diffraction pattern $H_R(x,y)$ is a diffraction pattern for R, $H_G(x,y)$ is a diffraction pattern for G, and $H_B(x,y)$ is a diffraction pattern for B.

$$H_R(x,y)=G(LR_{ideal}(x,y))$$

$$H_G(x,y)=G(LG_{ideal}(x,y))$$

$$H_B(x,y)=G(LB_{ideal}(x,y))$$

In the above formula, the predetermined arithmetic process such as the iterative Fourier transform algorithm is represented by a function G. The diffraction patterns $H_R(x,y)$, $H_G(x,y)$, and $H_B(x,y)$ thus calculated are output to the diffractive optical element drive section 114a.

Subsequently, the diffraction pattern calculation section 112a obtains the actual illumination distributions $LR_{real}(x,y)$, $LG_{real}(x,y)$, and $LB_{real}(x,y)$ using the diffraction patterns $H_R(x,y)$, $H_G(x,y)$, and $H_B(x,y)$ obtained in the step S48 (step S50). More specifically, the diffraction pattern calculation section 112a executes predetermined arithmetic processing such as a Fourier transform on the diffraction pattern of one frame using the diffraction patterns $H_R(x,y)$, $H_G(x,y)$, and $H_B(x,y)$ obtained in the step S48, thereby obtaining the actual illumination distributions $LR_{real}(x,y)$, $LG_{real}(x,y)$, and $LB_{real}(x,y)$ as shown in the following formula. The illumination distribution $LR_{real}(x,y)$ is an actual illumination distribution for R, $LG_{real}(x,y)$ is an actual illumination distribution for G, and $LB_{real}(x,y)$ is an actual illumination distribution for B.

$$LR_{real}(x,y)=F(H_R(x,y))$$

$$LG_{real}(x,y)=F(H_G(x,y))$$

$$LB_{real}(x,y)=F(H_B(x,y))$$

In the above formula, the function of executing the predetermined arithmetic process such as the Fourier transform throughout the entire pixels in one frame to obtain the actual illumination distribution for each of the pixels is represented as F. The actual illumination distributions $LR_{real}(x,y)$, $LG_{real}(x,y)$, and $LB_{real}(x,y)$ thus obtained are output to the transmission calculation section 122a.

Then, the transmission calculation section 122a of the light modulation element control section 120 obtains the transmission $T_R(x,y)$, $T_G(x,y)$, and $T_B(x,y)$ of the light modulation elements of the respective color components from the luminance $Y_R(x,y)$, $Y_G(x,y)$, and $Y_B(x,y)$ obtained in the step S42 and the actual illumination distributions $LR_{real}(x,y)$, $LG_{real}(x,y)$, and $LB_{real}(x,y)$ obtained in the step S50 (step S52).

$$T_R(x,y)=Y_R(x,y)/LR_{real}(x,y)$$

$$T_G(x,y)=Y_G(x,y)/LG_{real}(x,y)$$

$$T_B(x,y)=Y_B(x,y)/LB_{real}(x,y)$$

The transmission $T_R(x,y)$, $T_G(x,y)$, and $T_B(x,y)$ obtained by the above formula is output to the light modulation element drive section 124.

Then, the light source drive section 130a drives each of the light sources by controlling the intensity of the light beams emitted from the R light source 210R, the G light source 210G, and the B light source 210B based on the laser outputs $P_R$, $P_G$, and $P_B$ obtained in the step S44 respectively for the color components (step S54).

Further, the diffractive optical element drive section 114a generates the diffractive optical element control signals for controlling the R diffractive optical element 220R, the G diffractive optical element 220G, and the B diffractive optical element 220B based on the diffraction patterns $H_R(x,y)$, $H_G(x,y)$, and $H_B(x,y)$ obtained in the step S48, and outputs them to the respective diffractive optical elements (step S56). Thus, the light beams output from the R light source 210R, the G light source 210G and the B light source 210B are diffracted when transmitted through the R diffractive optical element 220R, the G diffractive optical element 220G, and the B diffractive optical element 220B, and realize the illumination distributions $LR_{real}(x,y)$, $LG_{real}(x,y)$, and $LB_{real}(x,y)$ on the R light modulation element 230R, the G light modulation element 230G, and the B light modulation element 230B, respectively.

Subsequently, the light modulation element drive section 124 drives each of the light modulation elements, the R light modulation element 230R, the G light modulation element 230G, and the B light modulation element 230B, so that the transmission obtained in the step S52 is achieved (step S58). Thus, the light beams emitted respectively to the R light modulation element 230R, the G light modulation element 230G, and the B light modulation element 230B are modulated, and the image is output.

Subsequently, if there is another input image signal to be processed subsequently (Y in the step S60), the process returns to the step S40, and the process is continued. On the other hand, if there is no input image signal to be processed subsequently (N in the step S60), the series of processes are terminated (END).

It should be noted that the process of the image processing device 100a according to the second embodiment can be realized by hardware such as a gate-array or a dedicated circuit, or by a software process. In this case, the hardware configuration example of the image processing device 100a according to the second embodiment is the same as that shown in FIG. 9.

It should be noted that also in the second embodiment, it is possible to adopt the configuration shown in FIG. 10 to execute the process shown in FIG. 11 in order for simplifying the process.

In the second embodiment as described hereinabove, the diffractive optical element is provided to each of the color components. Therefore, since it is arranged that the diffractive optical element is provided to each of the light sources, the intensity of the light beam emitted from the light source can be controlled for each of the color components, and thus it is not required to align the intensity of the light beams emitted from the light sources of the respective color components. Therefore, although the constituents are increased compared to the configuration of the first embodiment, there is some cases in which further reduction of power consumption can be achieved compared to the first embodiment.

Although the image processing device, the image display device, the image processing method, and a program according to the embodiments of the invention are hereinabove explained, the invention is not limited to the embodiments described above, but can be put into practice in various forms within the scope or the spirit of the invention, and the following modifications, for example, are also possible.

Although in each of the embodiments described above, the explanations are presented assuming that the image display device has the configuration shown in FIG. 2 or 12, the invention is not limited to these configurations, and can be applied to an image display device provided with a diffractive optical element and a light modulation element, an image processing device for controlling the image display device, an image processing method, and a program for controlling the image processing device.

Although in each of the embodiments described above, the explanations are presented assuming that the diffractive optical element is, for example, an LC-CGH, the invention is not limited thereto.

Although in each of the embodiments described above, the explanations are presented assuming that the light modulation element is a light valve formed of a transmissive liquid crystal panel, the invention is not limited thereto. It is also possible to adopt other devices than the transmissive liquid crystal panel such as a Digital Light Processing (DLP) (registered trademark) device or a Liquid Crystal On Silicon (LCOS) device as the light modulation element.

Although in each of the embodiments described above, the explanations are presented assuming that the image processing device has the configuration shown in FIG. 6 or 13, the invention is not limited thereto. The image processing device is not limited to those provided with all of the blocks shown in FIG. 6 or 13, but can have a configuration obtained by eliminating a part of the image processing device shown in FIG. 6 or 13. For example, in the image processing device shown in FIG. 6 or 13, the gamma conversion section 140 can be eliminated.

Although in each of the embodiments described above, the explanations are presented assuming that the diffraction pattern is obtained after the illumination distribution is obtained, the invention is not limited thereto.

Although in each of the embodiments described above, the explanations are presented assuming that the iterative Fourier transform algorithm is used as the method for obtaining the diffraction pattern, the invention is not limited by the arithmetic processing method for obtaining the diffraction pattern.

Although in each of the embodiment described above, the explanations are presented assuming that the diffractive optical element control signal is generated based on the input image signal, the invention is not limited thereto. It is also possible to generate the diffractive optical element control signal based on, for example, a shape of the screen on which the image display device projects an image.

In each of the embodiments described above, although the invention is explained as the image processing device, the image display device, the image processing method, and the program for making it possible to use the light from the light source, which is reduced for expressing a dark part of an image, for the other part of the image, the invention is not limited thereto. For example, the invention can be a recording medium on which a program describing the processing procedure for realizing the invention is recorded.

What is claimed is:

1. An image display device comprising:
   a light source;
   a diffractive optical element adapted to diffract a light beam emitted from the light source; and
   a light modulation element adapted to modulate a diffracted light beam obtained by the diffractive optical element,
   wherein a diffraction characteristic of the diffractive optical element is controlled based on a diffractive optical element control signal provided to the image display device,
   the diffractive optical element control signal is based on a diffraction pattern calculated to correspond to an ideal illumination distribution of light beams emitted to the light modulation element based on an input image signal that changes with time,
   the ideal illumination distribution includes an ideal illumination of each of a plurality of pixels of the input image signal, and
   the ideal illumination of each pixel is based on a ratio of a color component having maximum luminance for the pixel to an average of color components having maximum luminance for each of the plurality of pixels.

2. An image display device comprising:
   a plurality of light sources provided to respective color components;
   a diffractive optical element used commonly to the plurality of light sources, and adapted to diffract light beams emitted from the plurality of light sources; and
   a plurality of light modulation elements provided to the respective color components, and adapted to modulate the diffracted light beams obtained by the diffractive optical element,
   wherein a diffraction characteristic of the diffractive optical element is controlled based on a diffractive optical element control signal provided to the image display device, and
   the diffractive optical element control signal is based on a diffraction pattern calculated to correspond to an ideal illumination distribution of light beams emitted to the light modulation elements based on an input image signal that changes with time,
   the ideal illumination distribution includes an ideal illumination of each of a plurality of pixels of the input image signal, and
   the ideal illumination of each pixel is based on a ratio of a color component having maximum luminance for the pixel to an average of color components having maximum luminance for each of the plurality of pixels.

3. The image display device according to claim 2,
   wherein the plurality of light sources is controlled to emit the light beams with the same intensity, and
   the plurality of light modulation elements is controlled in an amount of modulation for each of the color components.

4. An image display device comprising:
   a plurality of light sources provided to respective color components;
   a plurality of diffractive optical elements provided to the respective color components, and adapted to diffract light beams emitted from the plurality of light sources corresponding to the respective color components; and
   a plurality of light modulation elements provided to the respective color components, and adapted to modulate the diffracted light beams obtained by the plurality of diffractive optical elements corresponding to the respective color components,
   wherein a diffraction characteristic of each of the diffractive optical elements is controlled based on a diffractive optical element control signal provided to the image display device,
   the diffractive optical element control signal is based on a diffraction pattern calculated to correspond to an ideal illumination distribution of light beams emitted to the light modulation elements based on an input image signal that changes with time,
   the ideal illumination distribution includes an ideal illumination of each of a plurality of pixels of the input image signal, and
   the ideal illumination of each pixel is based on a ratio of a color component having maximum luminance for the pixel to an average of color components having maximum luminance for each of the plurality of pixels.

5. The image display device according to claim 4,
   wherein the plurality of light sources is controlled in intensity of the light beams for each of the color components, and
   the plurality of light modulation elements is controlled in an amount of modulation for each of the color components.

6. The image display device according to claim 1,
   wherein the light source generates coherent light beam.

7. The image display device of claim 1, wherein the diffraction pattern is based on a Fourier transform of the illumination distribution.

8. The image display device of claim 1, wherein the diffraction pattern is calculated by performing a Fourier transform on the ideal illumination distribution.

* * * * *